(12) United States Patent
Scardino

(10) Patent No.: US 9,098,832 B1
(45) Date of Patent: Aug. 4, 2015

(54) SYSTEM AND METHOD FOR RECORDING A PHOTO CHAT SESSION

(75) Inventor: Patricia Scardino, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2191 days.

(21) Appl. No.: 11/273,738

(22) Filed: Nov. 15, 2005

(51) Int. Cl.
*G06F 15/16* (2006.01)
*G06Q 10/10* (2012.01)

(52) U.S. Cl.
CPC ................. *G06Q 10/107* (2013.01)

(58) Field of Classification Search
CPC ...... G06Q 10/10; G06Q 10/107; H04L 29/06; H04L 29/08072; H04L 29/06027; H04L 12/581; H04L 12/585; H04L 12/58; H04L 12/5855
See application file for complete search history.

(56) References Cited

U.S. PATENT DOCUMENTS

| | | | |
|---|---|---|---|
| 5,640,522 A * | 6/1997 | Warrin .......................... | 715/732 |
| 5,764,916 A | 6/1998 | Busey et al. .............. | 395/200.57 |
| 5,828,839 A | 10/1998 | Moncreiff ................ | 395/200.34 |
| 6,061,716 A | 5/2000 | Moncreiff ..................... | 709/204 |
| 6,434,599 B1 | 8/2002 | Porter ........................... | 709/204 |
| 6,434,604 B1 | 8/2002 | Harada et al. ................. | 709/207 |
| 6,442,590 B1 | 8/2002 | Inala et al. .................... | 709/204 |
| 6,629,100 B2 | 9/2003 | Morris et al. | |
| 6,912,563 B1 | 6/2005 | Parker et al. .................. | 709/204 |
| 7,080,124 B1 | 7/2006 | Shankar | |
| 7,330,875 B1 * | 2/2008 | Parasnis et al. ............... | 709/204 |
| 7,620,902 B2 | 11/2009 | Manion et al. | |
| 8,001,187 B2 | 8/2011 | Stochosky | |
| 2001/0033296 A1 * | 10/2001 | Fullerton et al. .............. | 345/730 |
| 2003/0023683 A1 | 1/2003 | Brown et al. ................. | 709/204 |
| 2003/0063770 A1 | 4/2003 | Svendsen et al. | |
| 2003/0097410 A1 | 5/2003 | Atkins et al. | |
| 2003/0101237 A1 | 5/2003 | Ban et al. | |
| 2003/0236830 A1 | 12/2003 | Ortiz et al. ................... | 709/204 |
| 2003/0236831 A1 | 12/2003 | Ortiz et al. ................... | 709/204 |
| 2003/0236832 A1 | 12/2003 | McIntyre et al. ............. | 709/204 |
| 2004/0003090 A1 | 1/2004 | Deeds .......................... | 709/227 |
| 2004/0041836 A1 * | 3/2004 | Zaner et al. .................. | 345/751 |
| 2004/0113934 A1 * | 6/2004 | Kleinman et al. ............ | 345/732 |
| 2004/0177116 A1 | 9/2004 | McConn et al. ............. | 709/204 |
| 2004/0205091 A1 * | 10/2004 | Mulcahy et al. ............. | 707/204 |
| 2004/0205168 A1 | 10/2004 | Asher | |

(Continued)

OTHER PUBLICATIONS

"Create a hyperlink to a custom show or location in the current presentation" (Microsoft Office PowerPoint Help), 2003, Microsoft Corporation.*

(Continued)

*Primary Examiner* — Karen Tang
*Assistant Examiner* — John Isom
(74) *Attorney, Agent, or Firm* — Withrow & Terranova, PLLC

(57) ABSTRACT

A system and method for recording a photo chat session are provided. In one embodiment, an online photo album is hosted by a peer node in a peer-to-peer (P2P) photosharing system, and a photo chat session is established between an owner at the peer node and a guest viewing the online photo album at a guest node. At the end of the photo chat session, either the owner or the guest requests that the photo chat session be saved. In response, the peer node generates a chat history including a slideshow for each shared image recreating a portion of the photo chat session related to the shared image. In another embodiment, an online photo album is hosted by a central node in a centrally hosted photosharing system, wherein the central node generates the chat history in response to a request from either the owner or the guest.

31 Claims, 24 Drawing Sheets

(56) References Cited

U.S. PATENT DOCUMENTS

| | | |
|---|---|---|
| 2005/0021624 A1* | 1/2005 | Herf et al. .................... 709/204 |
| 2005/0033806 A1 | 2/2005 | Harvey et al. ................ 709/204 |
| 2005/0052685 A1 | 3/2005 | Herf et al. |
| 2005/0086255 A1* | 4/2005 | Schran et al. ................ 707/102 |
| 2005/0091579 A1* | 4/2005 | Mewherter et al. .......... 715/513 |
| 2006/0190537 A1 | 8/2006 | Morris |
| 2007/0002057 A1 | 1/2007 | Danzig et al. |
| 2007/0027752 A1* | 2/2007 | Haslam .......................... 705/14 |

OTHER PUBLICATIONS

No Author, "Proactive Invitation and LiveEngage," (web article), obtained Sep. 10, 2008, 2 pages, http://web.archive.org/web/20041024003726/www.liveperson.com/sb/liveengage.asp.

* cited by examiner

SYSTEM AND METHOD FOR RECORDING A PHOTO CHAT SESSION

RELATED U.S. PATENT APPLICATION

This U.S. patent application is related to U.S. patent application Ser. No. 11/274,684, filed on Nov. 15, 2005, and entitled CHATTING WITH GUESTS WHILE SIMULTANEOUSLY VIEWING PHOTOS IN AN ONLINE PHOTO ALBUM, which is hereby incorporated herein by reference in its entirety.

FIELD OF THE INVENTION

The present invention relates to online photo albums and more particularly relates to recording a chat session between an owner of an online photo album and a guest viewing the online photo album.

BACKGROUND OF THE INVENTION

Photosharing has been part of our society since the advent of personal cameras. After taking photographs, film is developed and the resultant printed pictures are organized into a photo album or simply stored in some fashion. Thereafter, the owner of the pictures may share the pictures with a guest. In doing so, the owner and the guest are typically sitting side-by-side such that the owner and the guest can comment on each picture. For example, the owner and guest may exchange comments on the people in the picture, where the picture was taken, the day that the picture was taken, and the like. In this manner, the owner and the guest easily converse while viewing the pictures.

With the proliferation of digital cameras, a number of online photosharing systems have emerged in order to enable efficient and convenient sharing of digital images using online photo albums. Two architectures for online photosharing systems are a peer-to-peer (P2P) architecture or a centrally hosted architecture. In a P2P system, online photo albums are created and maintained on a peer node and served to guests from the peer node upon request. In a centrally hosted system, the photo albums are hosted on a central server and served from the central server to the guests upon request. These systems typically allow a guest to comment on a picture by entering the comment into a form. Thereafter, the owner of the picture may view the comment. However, these online photosharing systems do not allow the owner and guest to converse while an online photo album is being viewed by the guest. Thus, there remains a need for an online photosharing system that enables a photo chat session to be established between an owner of an online photo album and a guest viewing the online photo album.

Still further, since the participants in a chat session may desire to save the chat session, there remains a need for a system and method for recording a photo chat session between an owner of an online photo album and a guest viewing the online photo album.

SUMMARY OF THE INVENTION

The present invention provides a system and method for recording a photo chat session. In one embodiment, an online photo album is hosted by a peer node in a peer-to-peer (P2P) photosharing system, and a photo chat session is established between an owner at the peer node and a guest viewing the online photo album at a guest node. During the photo chat session, the owner and guest view images from the online photo album while chatting about the images. At the end of the photo chat session, either the owner or the guest requests that the photo chat session be saved. In response, the peer node generates a chat history including a slideshow for each shared image recreating a portion of the photo chat session related to the shared image. The chat history is generated using information defining the photo chat session stored at the peer node during the photo chat session. If the photo chat session is text-based, the information defining the photo chat session may include text chat messages exchanged between the owner and the guest for each shared image. If the photo chat session is voice-based, the information defining the photo chat session may include an audio recording of the conversation and information associating each image shared during the photo chat session with a corresponding portion of the conversation.

In another embodiment, an online photo album is hosted by a central node in a centrally hosted photosharing system, and a photo chat session is established between an owner associated with an owner node and a guest viewing the online photo album at a guest node. At the end of the photo chat session, either the owner or the guest requests that the photo chat session be saved. In response, the central node generates a chat history including a slideshow for each shared image recreating a portion of the photo chat session related to the shared image. The chat history is generated using information defining the photo chat session stored at the central node during the photo chat session.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for recording a photo chat session. In one embodiment, an online photo album is hosted by a peer node in a peer-to-peer (P2P) photosharing system, and a photo chat session is established between an owner at the peer node and a guest viewing the online photo album at a guest node. During the photo chat session, the owner and guest view images from the online photo album while chatting about the images. At the end of the photo chat session, either the owner or the guest requests that the photo chat session be saved. In response, the peer node generates a chat history including a slideshow for each shared image recreating a portion of the photo chat session related to the shared image. The chat history is generated using information defining the photo chat session stored at the peer node during the photo chat session. If the photo chat session is text-based, the information defining the photo chat session may include text chat messages exchanged between the owner and the guest for each shared image. If the photo chat session is voice-based, the information defining the photo chat session may include an audio recording of the conversation and information associating each image shared during the photo chat session with a corresponding portion of the conversation.

Figure 1:
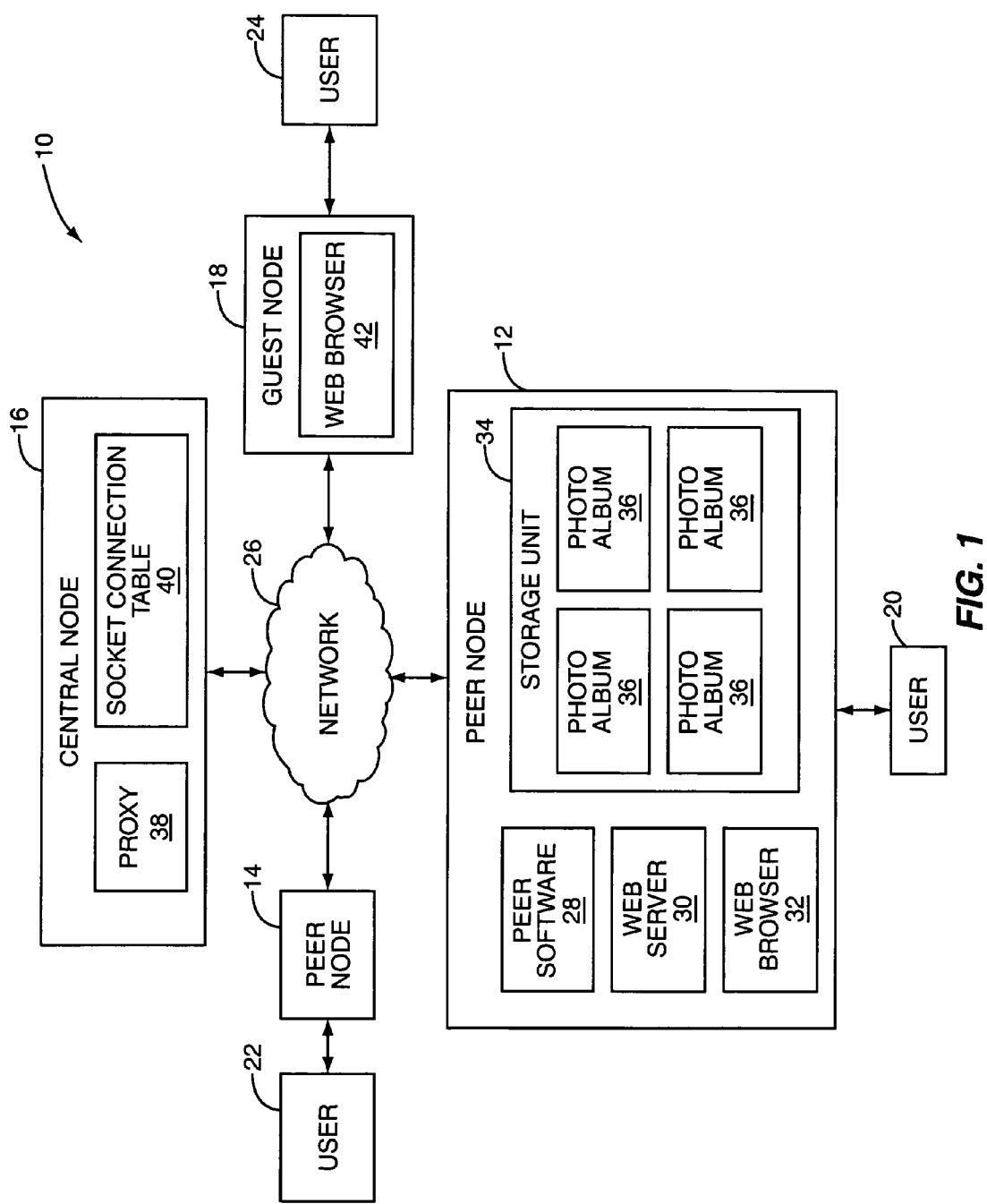
FIG. 1 illustrates an exemplary hybrid peer-to-peer (P2P) photosharing system according to one embodiment of the present invention.

FIG. 1 illustrates an exemplary hybrid peer-to-peer (P2P) system 10 for sharing online photo albums according to one embodiment of the present invention. The hybrid P2P system 10 includes peer nodes 12 and 14, a central node 16, a guest node 18, users 20-24, and network 26. Preferably, the network 26 is the Internet. There may be any number of peer nodes 12 and 14 and guest nodes 18. Details of the hybrid P2P system 10 can be found in U.S. patent application Ser. No. 10/813,839, entitled METHOD AND SYSTEM FOR PROVIDING WEB BROWSING THROUGH A FIREWALL IN A PEER TO PEER NETWORK, filed on Mar. 31, 2004, currently pending, which is hereby incorporated by reference in its entirety.

In general, the peer nodes 12 and 14 are personal computers, mobile terminals, Personal Digital Assistants, or the like having access to the network 26. As illustrated, the peer node 12 includes peer software 28, a web server 30, optionally a web browser 32, and a storage unit 34. It should be noted that the discussion herein of the peer node 12 is equally applicable to the peer node 14. The web server 30 may be implemented in hardware and/or software. The storage unit 34 may be memory such as Random Access Memory (RAM) or some other storage device such as a hard disc drive. The storage unit 34 operates to store a number of photo albums 36 each comprising a number of digital images. The central node 16 includes a proxy 38 and a socket connection table 40. The guest node 18 is also a personal computer, mobile terminal, Personal Digital Assistant, or the like having access to the network 26. Preferably, the guest node 18 includes a web browser 42.

In operation, when the peer node 12 comes online by either connecting to the network 26 or by enabling the peer software 28, the peer node 12 establishes a socket connection with the central node 16 and more specifically with the proxy 38. The central node 16 stores information identifying the socket connection and associating the socket connection with the peer node 12 in the socket connection table 40. The user 20 at the peer node 12 may then invite the user 24 at the guest node 18 to view one or more of the photo albums 36 by, for example, sending an email invitation including a unique web link to the photo albums 36 at the peer node 12. The user 20 may also be referred to as an owner of the photo albums 36, and the user 24 may also be referred to as a guest. When the user 24 at the guest node 18 desires to view one of the photo albums 36 residing at the peer node 12, the web browser 42 generates a Hypertext Transfer Protocol (HTTP) request and provides the HTTP request to the proxy 38 over the network 26. It should be noted that the HTTP request is exemplary and that the request from the guest node 18 may be implemented in any protocol desired for communication between the central node 16 and the guest node 18.

The proxy 38 translates the HTTP request into a request message including one or more request packets. In one embodiment, the request message may be a proprietary request message. Using the socket connection table 40, the proxy 38 identifies the socket connection that connects the peer node 12 to the proxy 38. The proxy 38 then sends the request message to the peer node 12 via the socket connection.

In response to receiving the request message from the proxy 38, the peer node 12, and particularly the peer software 28, converts the request message into an HTTP request and provides the HTTP request to the web server 30. In response to the HTTP request, the web server 30 generates an HTTP response including a webpage including the requested photo album 36. For example, the webpage may include thumbnail images of the digital images in the requested photo album 36. The peer software 28 converts the HTTP response into a response message including one or more response packets and sends the response message to the proxy 38 via the socket connection. The proxy 38 then converts the response message from the peer node 12 into an HTTP response and sends the HTTP response to the web browser 42 at the guest node 18. Upon receiving the HTTP response, the web browser 42 displays the webpage corresponding to the requested photo album 36 to the user 24 at the guest node 18.

Figure 2:
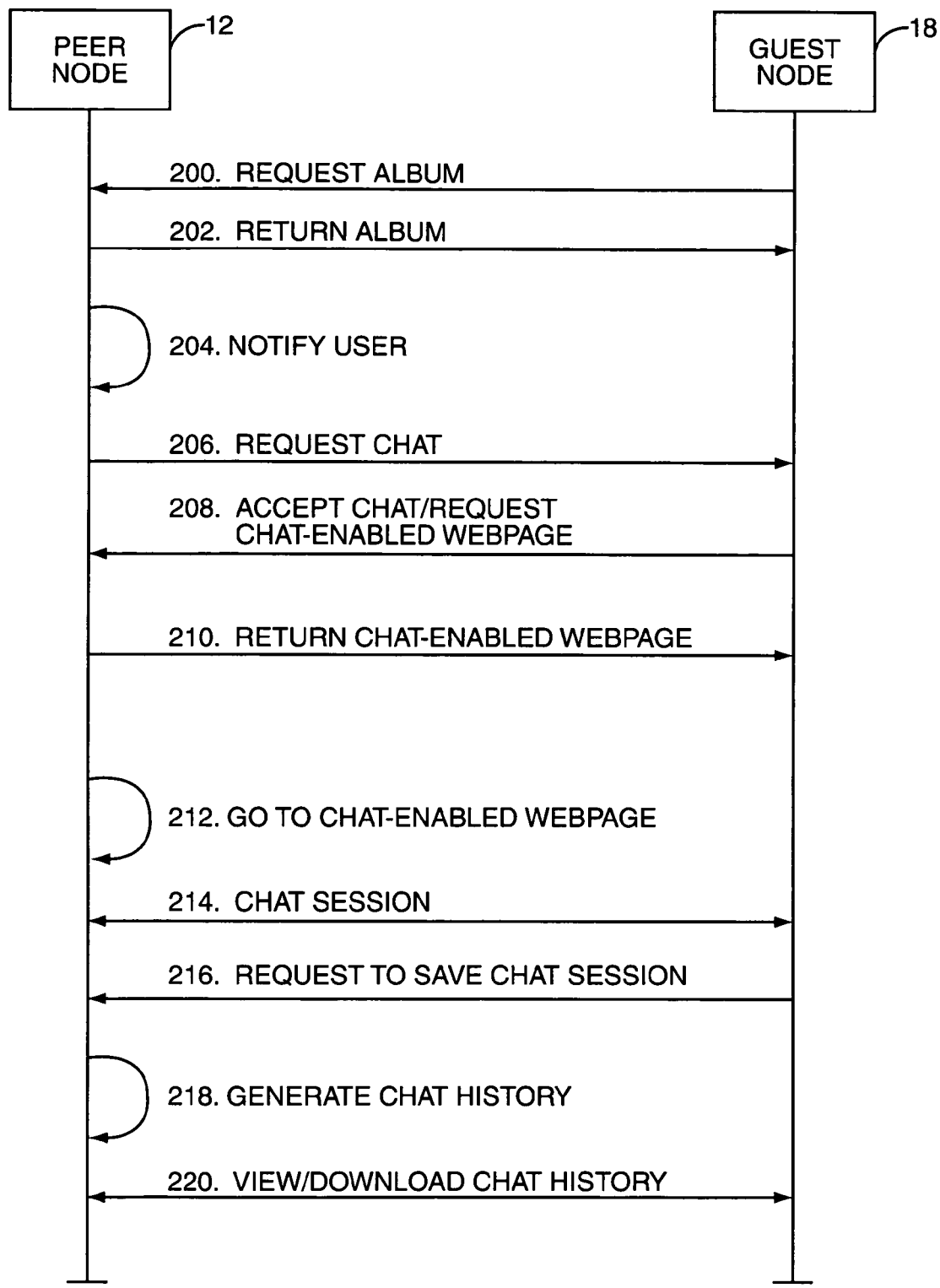
FIG. 2 illustrates an exemplary process for establishing a photo chat session between an owner of an online photo album and a guest viewing the online photo album at the request of the owner according to one embodiment of the present invention.
Figure 3:
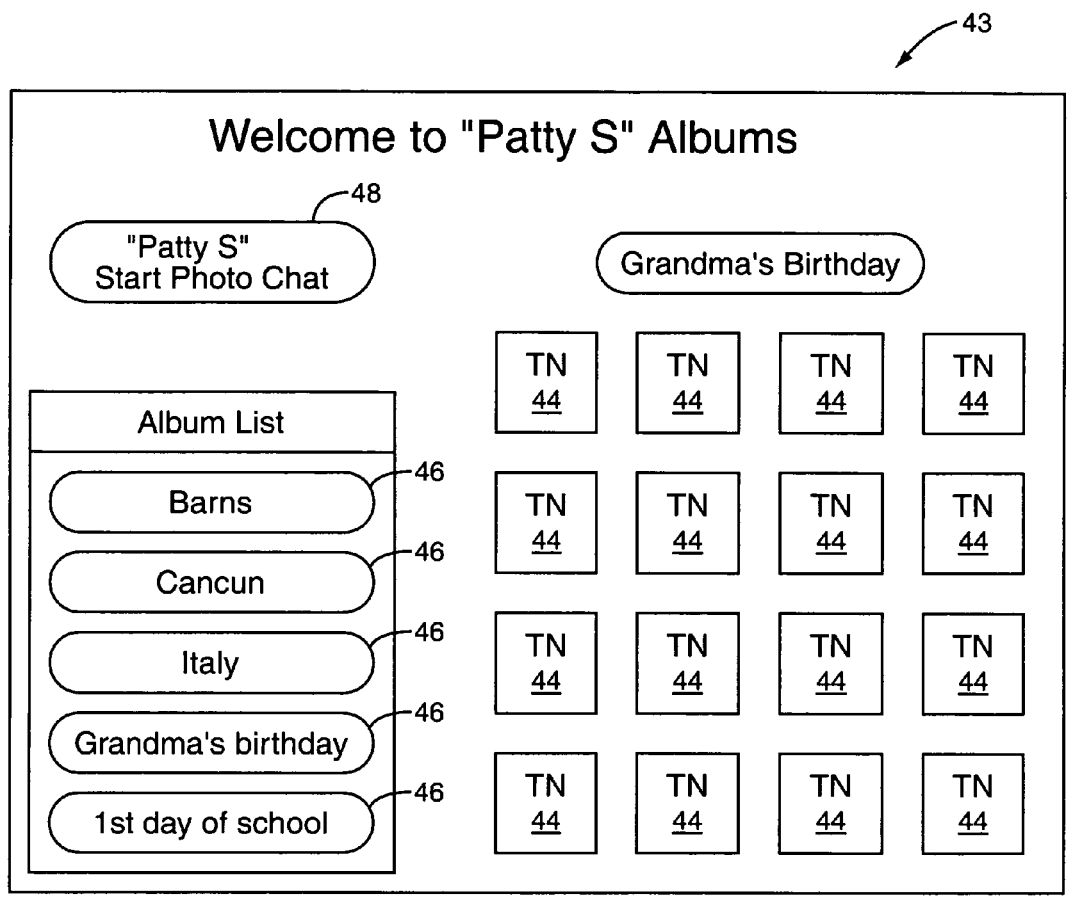
FIG. 3 illustrates an exemplary photo album webpage according to one embodiment of the present invention.

FIG. 2 illustrates the process of establishing a photo chat session according to one embodiment of the present invention. As described above, the guest node 18 requests one of the photo albums 36 from the peer node 12 (step 200); and, in response, the peer node 12 provides the requested one of the photo albums 36 to the guest node 18 as a photo album webpage (step 202). An exemplary photo album webpage 43 including the digital images from the photo album 36 requested by the guest node 18 is illustrated in FIG. 3. In this example, the requested one of the photo albums 36 is entitled "Grandma's Birthday." As shown, the photo album webpage 43 may include thumbnail images 44 corresponding to the digital images in the photo album 36. Preferably, the photo album webpage 43 also includes web links 46 to the other photo albums 36 at the peer node 12 and a "Start Photo Chat" button 48. As discussed below, the "Start Photo Chat" button 48 may enable the user 24 at the guest node 18 to either accept a chat request from the user 20 at the peer node 12 or to request a chat with the user 20 at the peer node 12.

Figure 4:
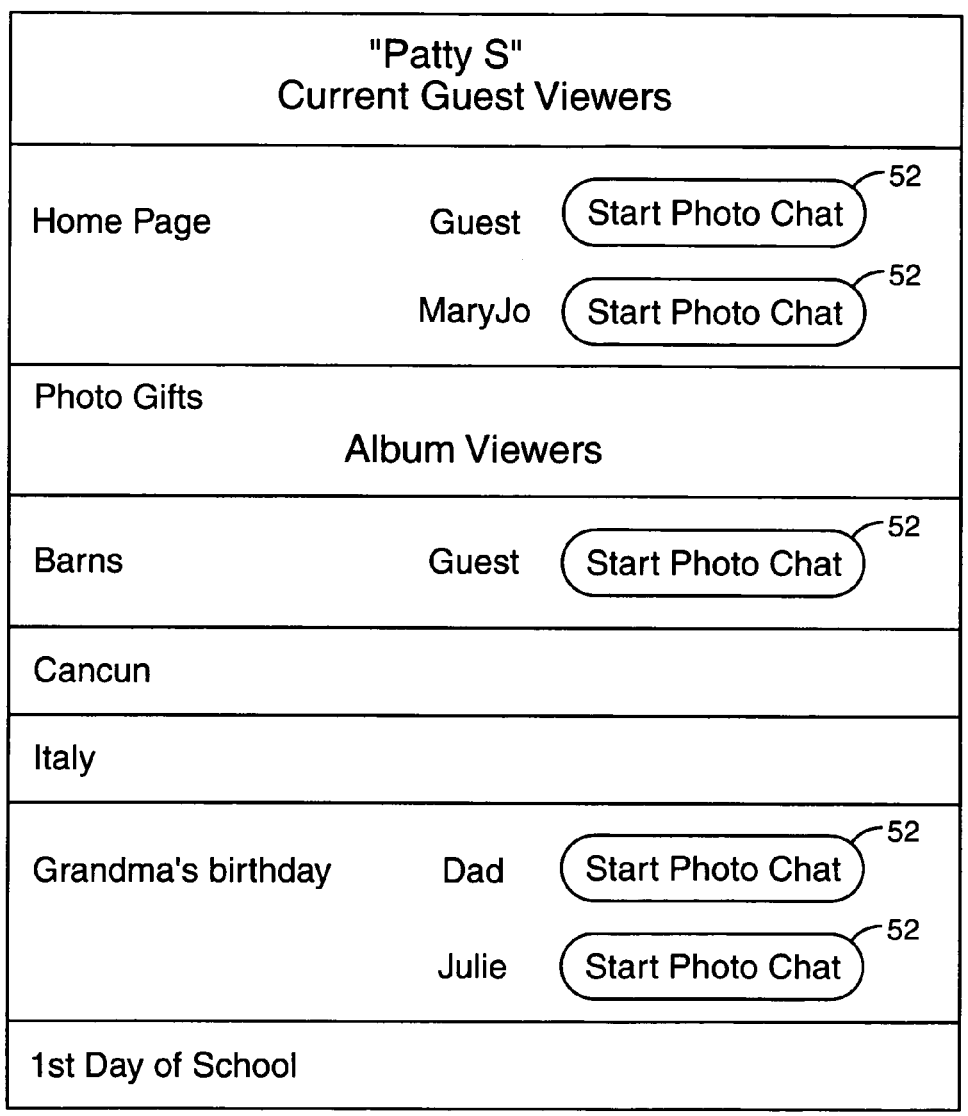
FIG. 4 illustrates an exemplary guest list provided to the owner of online photo albums according to one embodiment of the present invention.

Returning to FIG. 2, the peer node 12, and more specifically the peer software 28, then notifies the user 20 that the user 24 at the guest node 18 is currently viewing the photo album 36 (step 204). In the preferred embodiment, the peer software 28 notifies the user 20 by providing a list of guests 50, as illustrated in FIG. 4. As will be apparent to one of ordinary skill in the art, the list of guests 50 may be generated based on the Internet Protocol (IP) or like address of the guest node 18 embedded within requests from the web browser 42. If the user 24 at the guest node 18 goes through a log-in process, the IP address of the guest node 18 may be associated with a nickname or username, wherein the nickname or username is displayed in the list of guests 50.

The list of guests 50 is displayed to the user 20 at the peer node 12 and informs the user 20 of the guests viewing each of the photo albums 36. In one embodiment, the list of guests 50 is displayed by the web browser 32. In this example, a first guest and "MaryJo" are currently viewing the homepage of the peer node 12, a second guest is viewing the "Barns" photo album, and "Dad" and "Julie" are viewing the "Grandma's Birthday" photo album. As these guests view different photo albums 36 or new guests begin to view one of the photo albums 36, the list of guests 50 is updated by the peer software 28. The peer software 28 may continuously maintain the list of guests 50 and display the list of guests 50 to the user 20 upon request. Alternatively, the peer software 28 may only generate the list of guests 50 upon request by the user 20. In addition, if the user 20 is not viewing the list of guests 50, the peer software 28 may be configured to notify the user 20 when a new guest has started viewing one of the photo albums 36 by, for example, providing a "pop-up" message or email notification. In response to such notification, the user 20 may then request that the list of guests 50 be displayed at the peer node 12.

Returning again to FIG. 2, if the user 20 desires to chat with one of the guests currently viewing one of the photo albums 36, the user 20 requests a chat by, for example, activating a "Start Photo Chat" button 52 associated with the guest in the list of guests 50 (step 206). In this example, the user 20 activates the "Start Photo Chat" button 52 associated with the user 24 at the guest node 18. The request may be implemented as a request for a chat-enabled webpage and provided to the web server 30 at the peer node 12. In response, the web server 30 provides a request to the guest node 18 via the peer software 28 and the proxy 38. In one embodiment, the request is provided to the guest node 18 as a pop-up window including a web link to the chat-enabled webpage. In another embodiment, the request is provided to the guest node 18 by causing the "Start Photo Chat" button 48 (FIG. 3) to either appear in the photo album webpage 43 currently viewed by the user 24 at the guest node 18 or by causing the "Start Photo Chat" button 48 to start blinking, change colors, or the like.

The user 24 at the guest node 18 then accepts the chat request, and the guest node 18 sends a request for the chat-enabled webpage to the peer node 12 via the proxy 38 (step 208). In one embodiment, the user 24 at the guest node 18 accepts the chat request by clicking on the "Start Photo Chat" button 48 in the photo album webpage 43 (FIG. 3) being viewed. When the user clicks on the "Start Photo Chat" button 48, the web browser 42 at the guest node 18 generates the request for the chat-enabled webpage. The web browser 42 may generate the request for the chat-enabled webpage using a web link embedded in the photo album webpage 43 in association with the "Start Photo Chat" button 48.

Upon receiving the request for the chat-enabled webpage from the guest node 18, the peer node 12 returns the chat-enabled webpage to the guest node 18 (step 210). In one embodiment, the peer software 28 receives the request for the chat-enabled webpage and translates the request into an HTTP request for the chat-enabled webpage. Based on the HTTP request, the web server 30 provides the chat-enabled webpage. The chat-enabled webpage is then provided to the guest node 18 via the peer software 28 and the proxy 38. The web server 30 also directs the web browser 32 at the peer node 12 to the chat-enabled webpage (step 212). At this point, the photo chat session is established, and the user 20 at the peer node 12 and the user 24 at the guest node 18 chat with one another while simultaneously viewing images from one or more of the photo albums 36 (step 214). Although the discussion herein focuses on a text-based photo chat session, the present invention is equally applicable to a voice-based photo chat session.

Figure 5A:
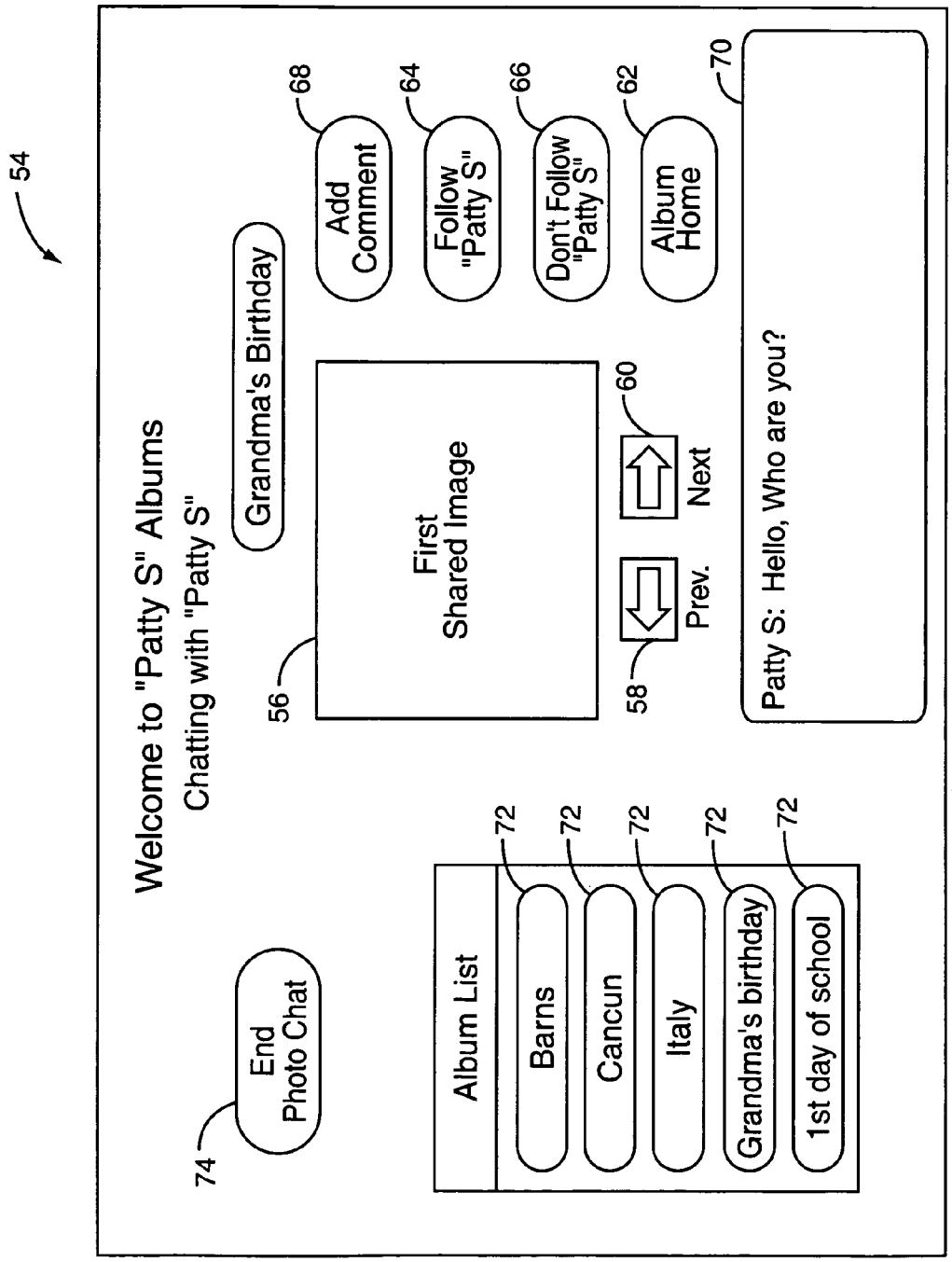
FIGS. 5A-5G illustrate an exemplary chat-enabled webpage during an exemplary photo chat session according to one embodiment of the present invention.

An exemplary chat-enabled webpage 54 is illustrated in FIGS. 5A-5G. As illustrated in FIG. 5A, the chat-enabled webpage 54 may include a shared image 56 corresponding to one of the digital images in the photo album 36, a "previous" button 58, a "next" button 60, an "album home" button 62, a "follow" button 64, a "don't follow" button 66, an "add comment" button 68, a chat-enabled area 70, links to the other photo albums 72, and an "end chat" button 74. As an example, the shared image 56 may initially be the first image of the photo album 36 being viewed by the user 24 at the guest node 18 when the photo chat session was initiated. Alternatively, the chat-enabled webpage 54 may initially be similar to the photo album webpage 43 of FIG. 3 and include the thumbnail images 44 and the chat-enabled area 70. Upon selecting one of the thumbnail images 44, the chat-enabled webpage 54 may then be updated to be as shown in FIG. 5A.

The "previous" button 58 and the "next" button 60 allow the users 20 and 24 to browse the photo album 36 by changing the shared image 56 to either the previous or next image in the photo album 36. The "album home" button 62 may enable the users 20 and 24 replace the shared image 56 and the buttons 58-62 with thumbnails of all or at least a portion of the images in the photo album 36 similar to the photo album webpage 43 of FIG. 3.

The "follow" button 64 may be enabled by either the user 20 at the peer node 12 or the user 24 at the guest node 18. If the user 20 enables the "follow" button 64, the user 20 effectively "follows" the user 24 as the user 24 browses through the photo albums 36. More specifically, as the user 24 browses through the photo albums 36, the chat-enabled webpage 54 viewed by the user 20 at the peer node 12 is updated such that the user 20 views the same images as the user 24 at the guest node 18. Likewise, if the user 24 enables the "follow" button 64, the user 24 "follows" the user 20 as the user 20 browses through the photo albums 36. The "don't follow" button 66 is optional and may be used by either the user 20 or the user 24 to deactivate the "follow" feature.

As discussed below in more detail, the "add comment" button 68 may be used by either the user 20 or the user 24 to add an indictor, such as a thumbtack or flag, to a particular location on the shared image 56 and a comment associated with the indicator. The chat-enabled area 70 enables text chatting between the users 20 and 24. Again, while this example focuses on a text-based photo chat session, the present invention is equally applicable to a voice-based photo chat session.

FIGS. 5A-5G illustrate the operation of the chat-enabled webpage 54 during an exemplary photo chat session. In FIG. 5A, the user 20, which has the nickname "Patty S," starts the chat by entering the text message "Hello. Who are you?" in the chat-enabled area 70 of the chat-enabled webpage 54 viewed at the peer node 12. In response, the web browser 42 at the guest node 18 communicates the entered text to the web server 30, and the web server 30 operates to update the chat-enabled webpage 54 viewed at the guest node 18 to include the text message entered at the peer node 12. In the preferred embodiment, the web server 30 operates to communicate only the portion of the chat-enabled webpage 54 that has changed to the guest node 18. Thus, the web server 30 may communicate only the text entered by the user 20 to the web browser 42 at the guest node 18 via the peer software 28 and the proxy 38.

Figure 5B:
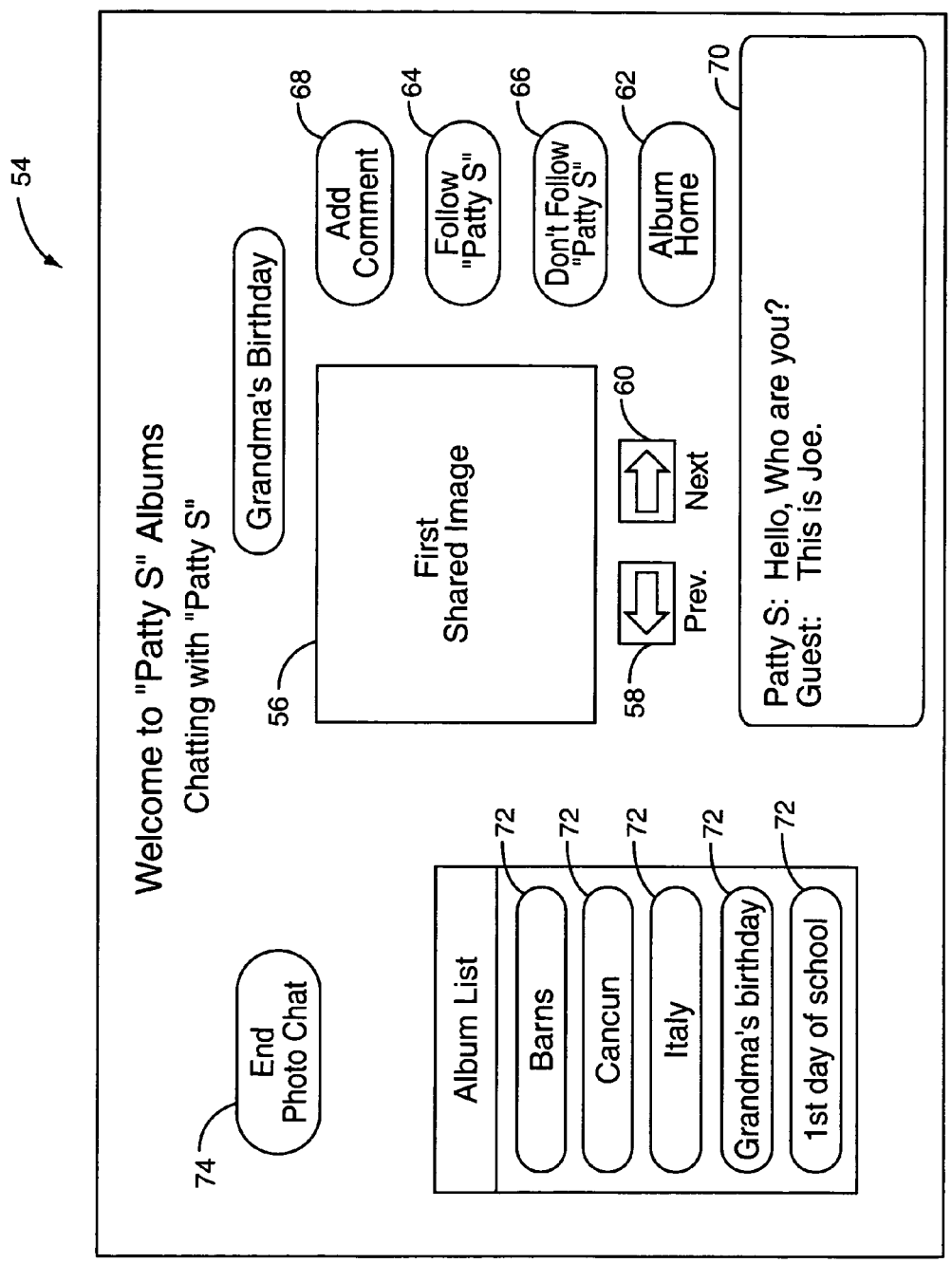
Figure 5C:
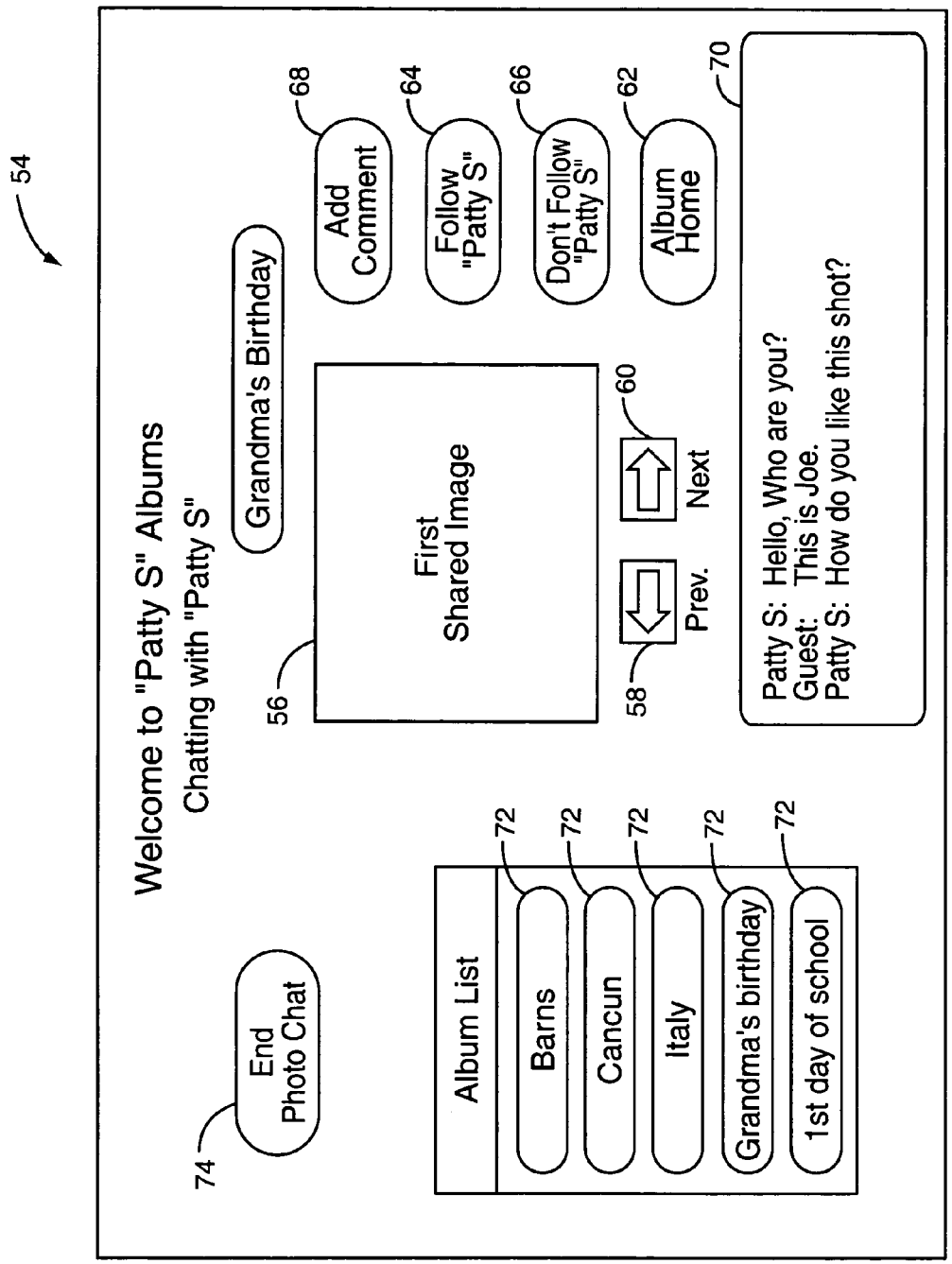
Figure 5D:
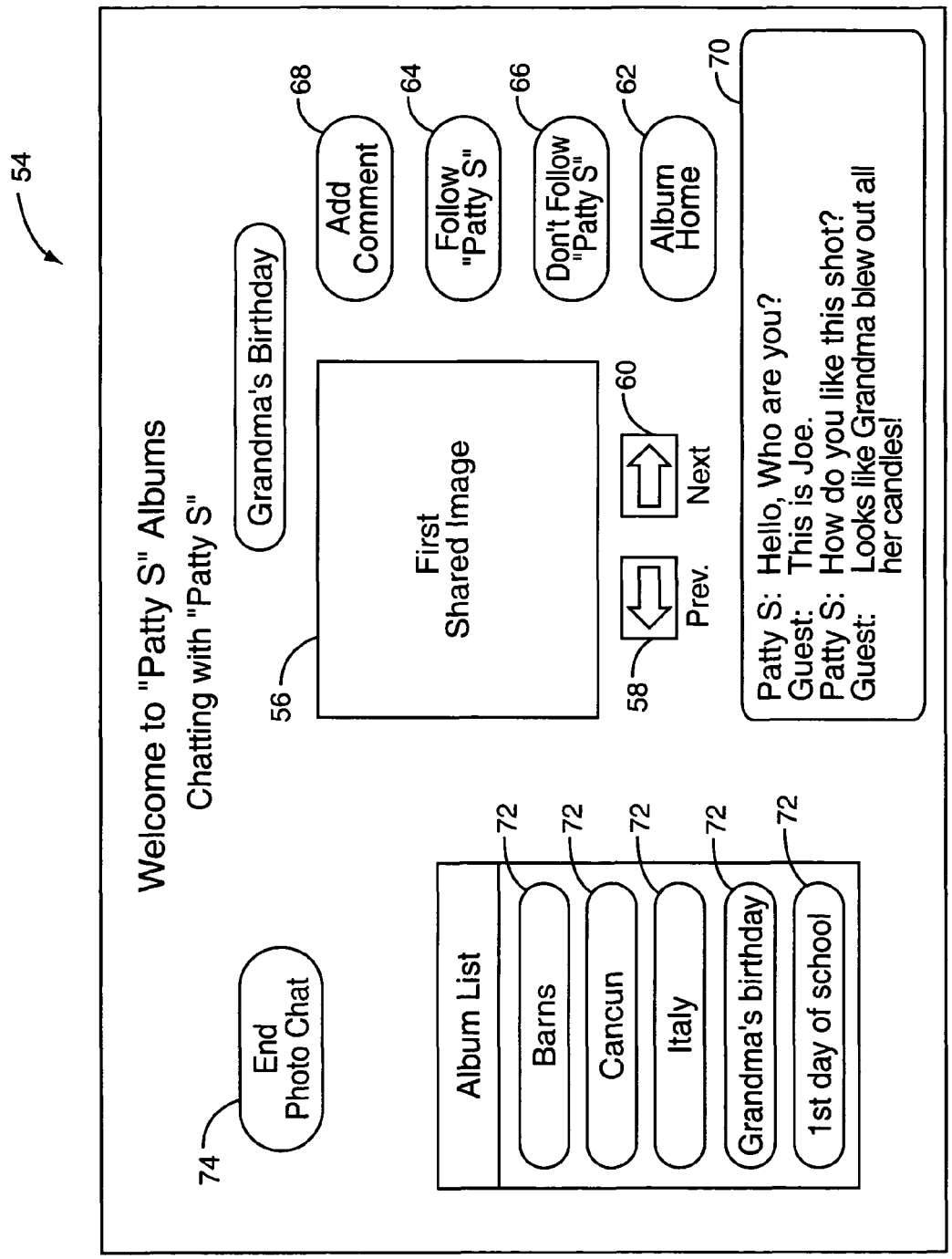

As illustrated in FIG. 5B, the user 24 responds by entering the text "This is Joe." in the chat-enabled area 70 at the guest node 18. The web browser 42 at the guest node 18 communicates with the peer node 12 via the proxy 38 such that the web browser 32 at the peer node 12 is updated to include the entered text message. Then, as shown in FIG. 5C, the user 20 may enter the text message "How do you like this shot?" Again, the web browser 32 communicates this text message to the web server 30, and the web server 30 communicates the text message to the web browser 42 at the guest node 18 via the peer software 28 and the proxy 38. As shown in FIG. 5D, the user 24 at the guest node may then respond: "Looks like Grandma blew out all her candles!"

Figure 5E:
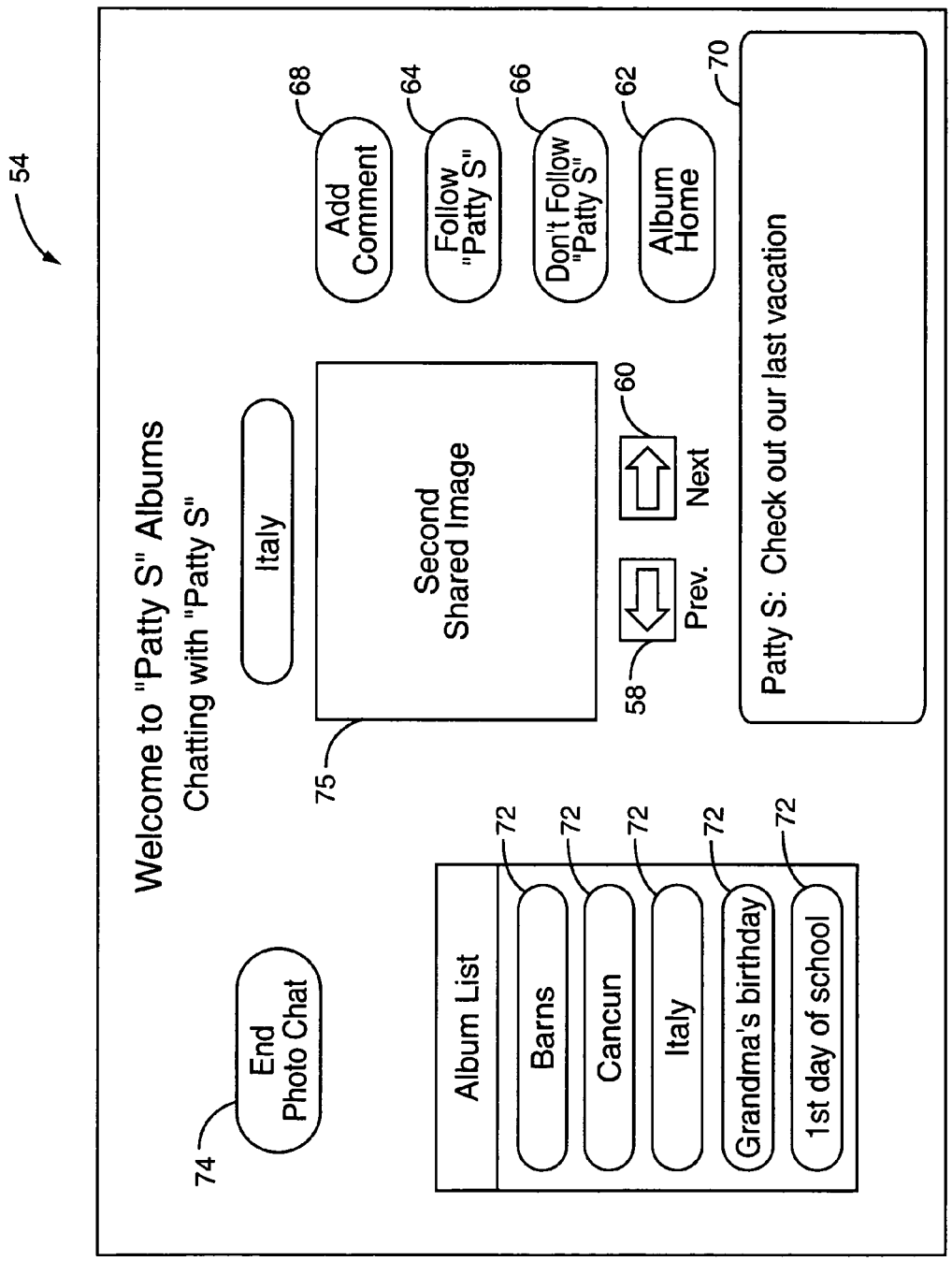

The user 20 may then activate the link 72 for the photo album 36 entitled "Italy" as shown in FIG. 5E. Assuming that the user 24 has chosen to "follow" the user 20, the web server 30 may operate to update the chat-enabled webpage 54 for both the user 20 and the user 24 to include a second shared image 75. The second shared image 75 may be the first image in the photo album 36 entitled "Italy." Then, the chat continues when the user 20 enters the text message: "Check out our last vacation."

Figure 5F:
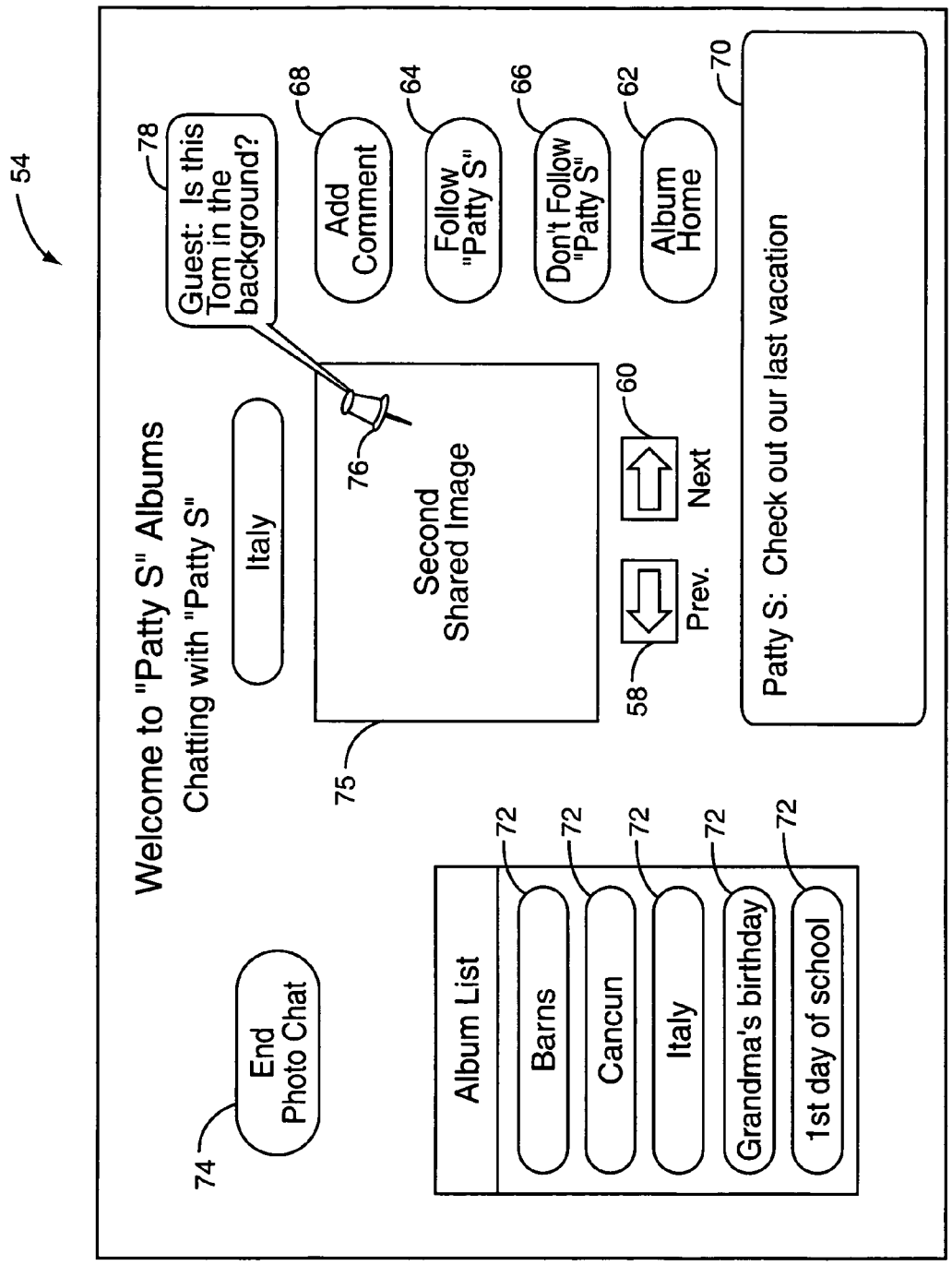
Figure 5G:
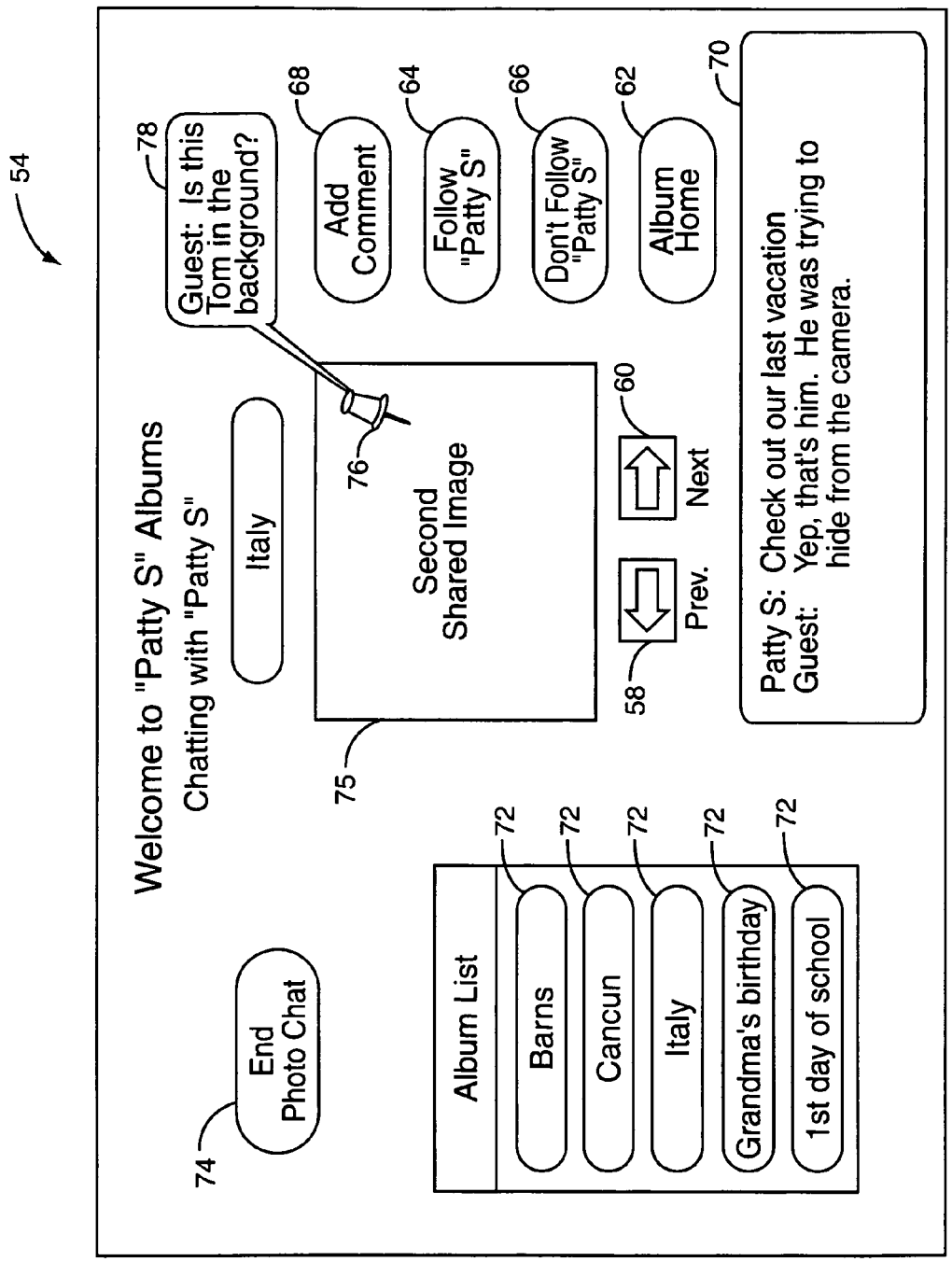

FIG. 5F illustrates a commenting feature of the chat-enabled webpage 54. The user 24 may activate the "add comment" button 68. By doing so, the chat-enabled webpage 54 enables the user 24 to place an indicator 76 on a particular point of interest in the second shared image 75 and to optionally add a comment 78 associated with the indicator 76. In this example, the comment 78 asks: "Is this Tom in the background?" Once the indicator 76 and comment 78 are added, the chat-enabled webpage 54 viewed by the user 20 at the peer node 12 is updated by the web server 30 to also include the indicator 76 and the comment 78. Thereafter, as illustrated in FIG. 5G, the user 20 may respond: "Yep, that's him. He was trying to hide from the camera."

Returning to FIG. 2, when either the user 20 or the user 24 desires to end the photo chat session, the photo chat session may be ended by, for example, activating the "End Photo Chat" button 74 in the chat-enabled webpage 54 (FIGS. 5A-5G). At this point, either the user 20 or the user 24 may also request that the photo chat session be saved. For example, once the photo chat session is ended, the text within the "End Photo Chat" button 74 may be changed to "Save Photo Chat." If the user 24 then activates the button 74, the web browser 42 at the guest node 18 generates a request to save the photo chat session and sends the request to the peer node 12 via the proxy 38 (step 216). In response, the peer node 12, and specifically the peer software 28, generates a chat history (step 218). Thereafter, since in this example the user 24 requested that the photo chat session be saved, the chat history may be viewed by the user 24 at the guest node 18 or downloaded to the guest node 18 (step 220).

The chat history is generated based on information stored at the peer node 12 during the photo chat session. For example, during the photo chat session, a series of entries may be stored in a database, where the entries may include identifiers of images viewed during the photo chat session, the text from the photo chat session, information identifying the indicators 76, and the comments 78 associated with the indicators 76. The entries are stored sequentially as the corresponding event occurs in the photo chat session. Alternatively, if the photo chat session is a voice-based photo chat session, the conversation between the users 20 and 24 may be recorded as an audio file. Delimiters may be placed within the audio file associating each of the images shared, or viewed, during the photo chat session with the corresponding portion of the conversation. Alternatively, a table may be maintained that associates the images shared during the photo chat session with the corresponding portions of the conversation. Whether the photo chat session is text-based or voice-based, the peer software 28 uses the information recorded during the photo chat session to generate the chat history. The chat history may be generated as an executable file or a series of interactive webpages. The chat history may be stored at the peer node 12 such that either the user 20 or the user 24 may view of chat history. Alternatively, the chat history may be downloaded to the guest node 18. After download to the guest node 18, the peer node 12 may or may not retain a copy of the chat history for viewing by the user 20 or subsequent re-transmission to the guest node 18.

Figure 6A:
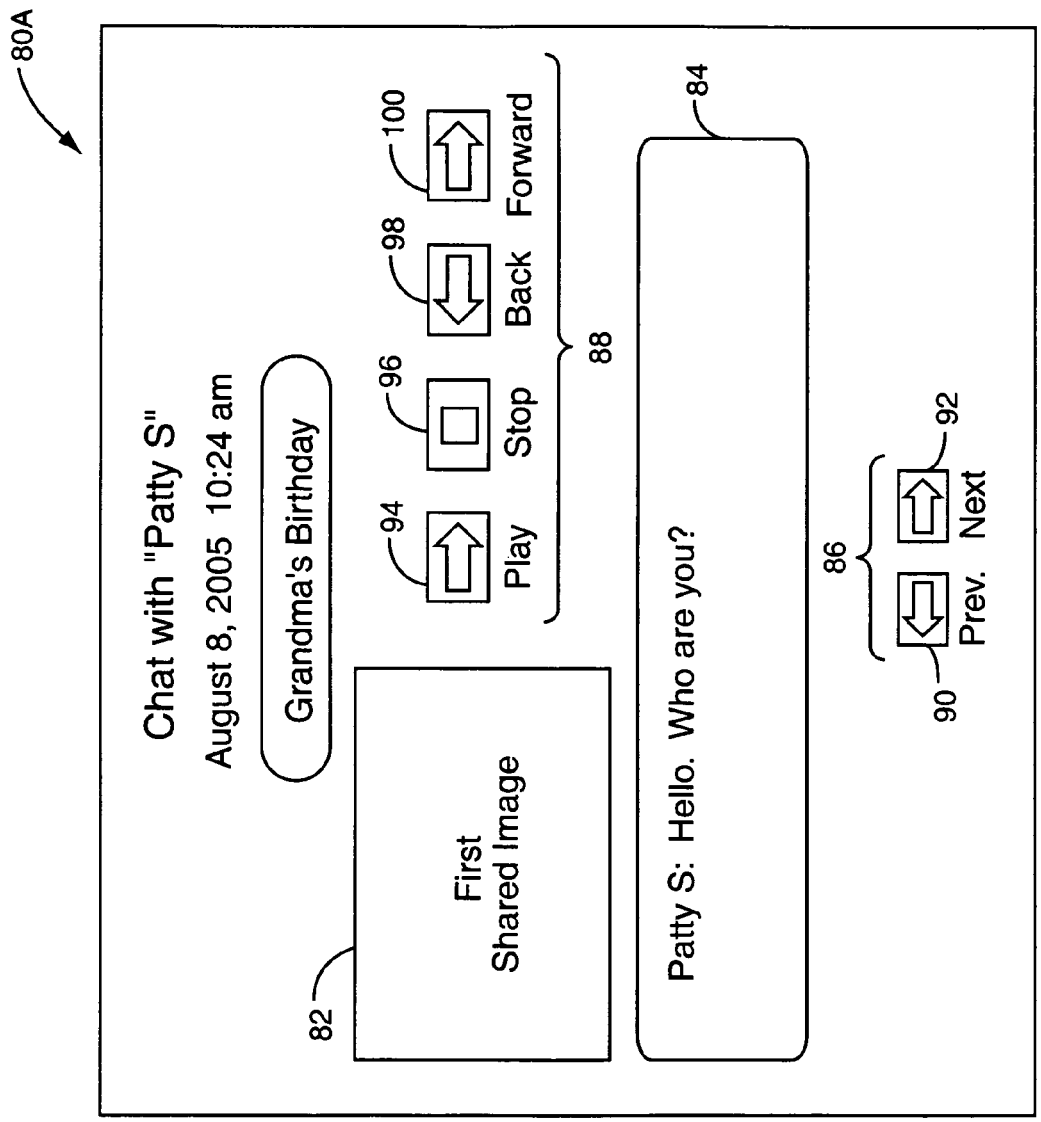
FIGS. 6A-6G illustrate an exemplary chat history according to one embodiment of the present invention.

According to one embodiment of the present invention, the chat history is generated as a slideshow having a main slideshow showing the images shared during the photo chat session and a secondary slideshow for each image recreating the portion of the photo chat session for that image. An exemplary chat history is shown in FIGS. 6A-6G. The exemplary chat history corresponds to the photo chat session described above with respect to FIGS. 5A-5G. Again, while this example focuses on a text-based photo chat session, the present invention is equally applicable to a voice-based photo chat session. As shown in FIG. 6A, a first slide 80A of the chat history includes a first shared image 82 and chat area 84 including the first text chat message entered by the user 20. The first slide 80A also includes main controls 86 and secondary controls 88. The main controls 86 may include a "previous" button 90 and a "next" button 92, which enable the viewer to manually step through the main slideshow by going to the previous shared image or the next shared image. The secondary controls 88 may include a "play" button 94, a "stop" button 96, a "back" button 98, and a "forward" button 100. The "play" button 94 may enable the viewer to play the secondary slideshow illustrating the chat history for the first shared image 82. The "stop button" 96 may be used to stop the secondary slideshow when it is playing. The "back" and "forward"

buttons 98 and 100 may be used to manually step through the secondary slideshow illustrating the chat history for the first shared image 82.

Figure 6B:
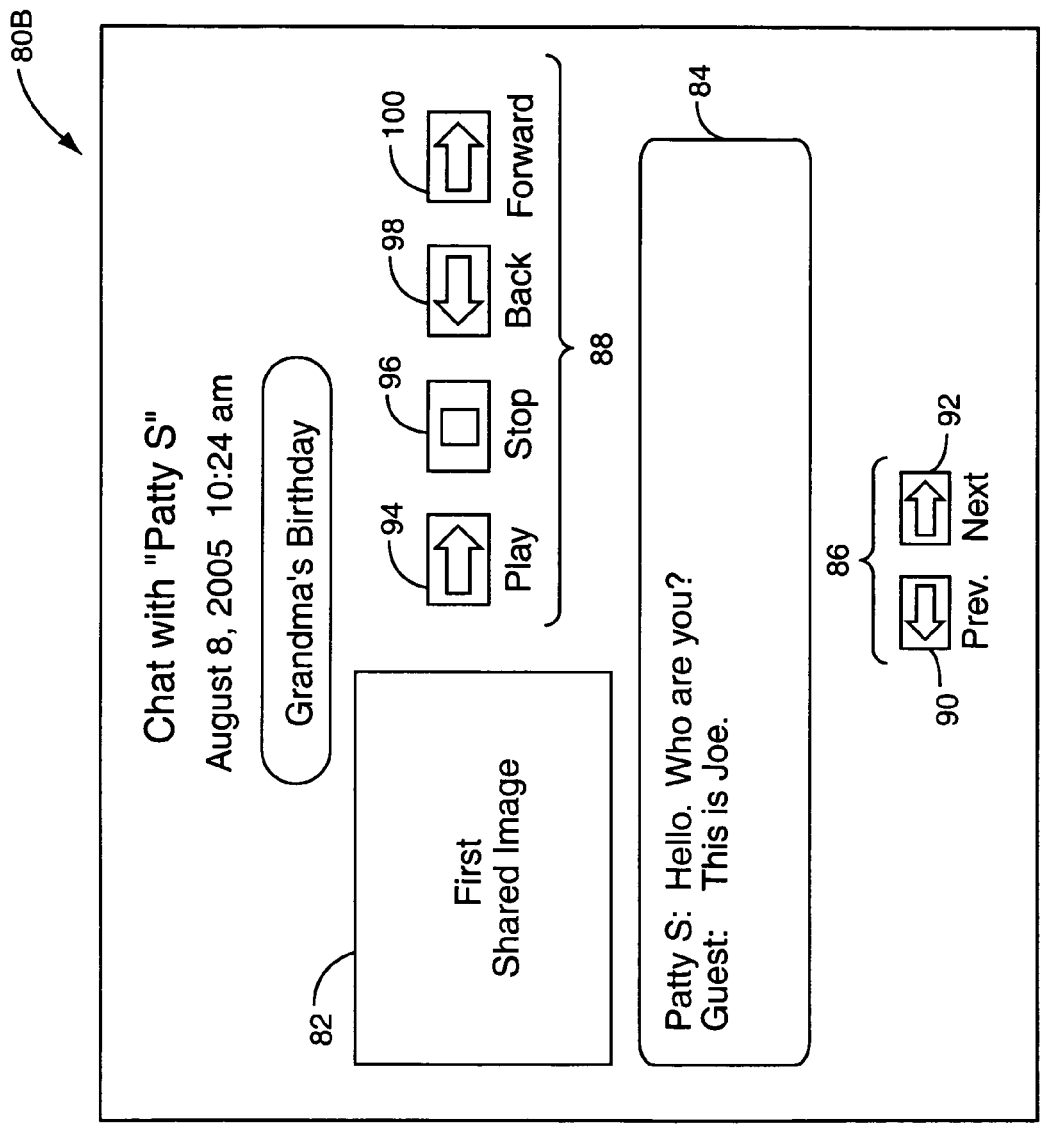
Figure 6C:
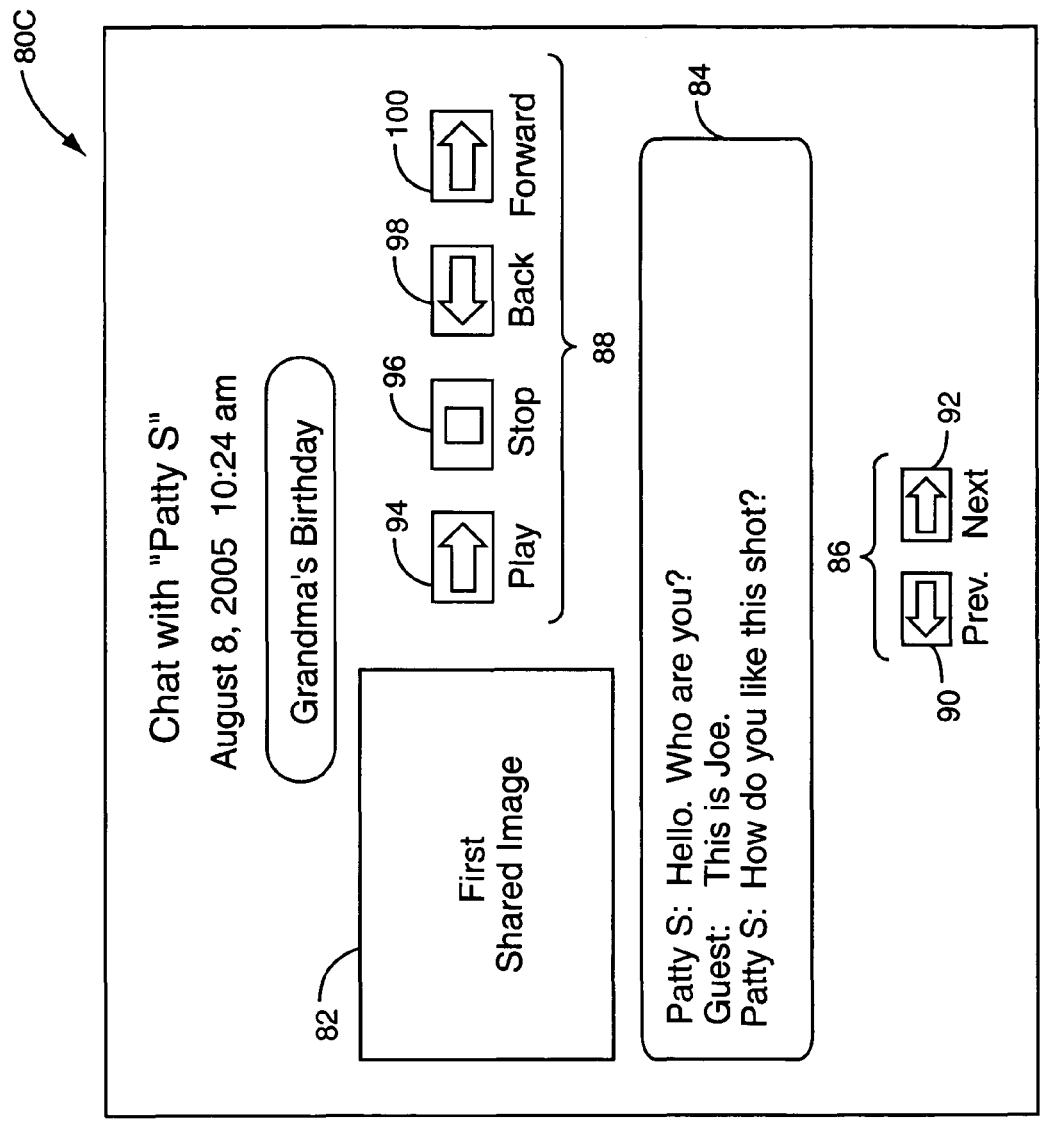
Figure 6D:
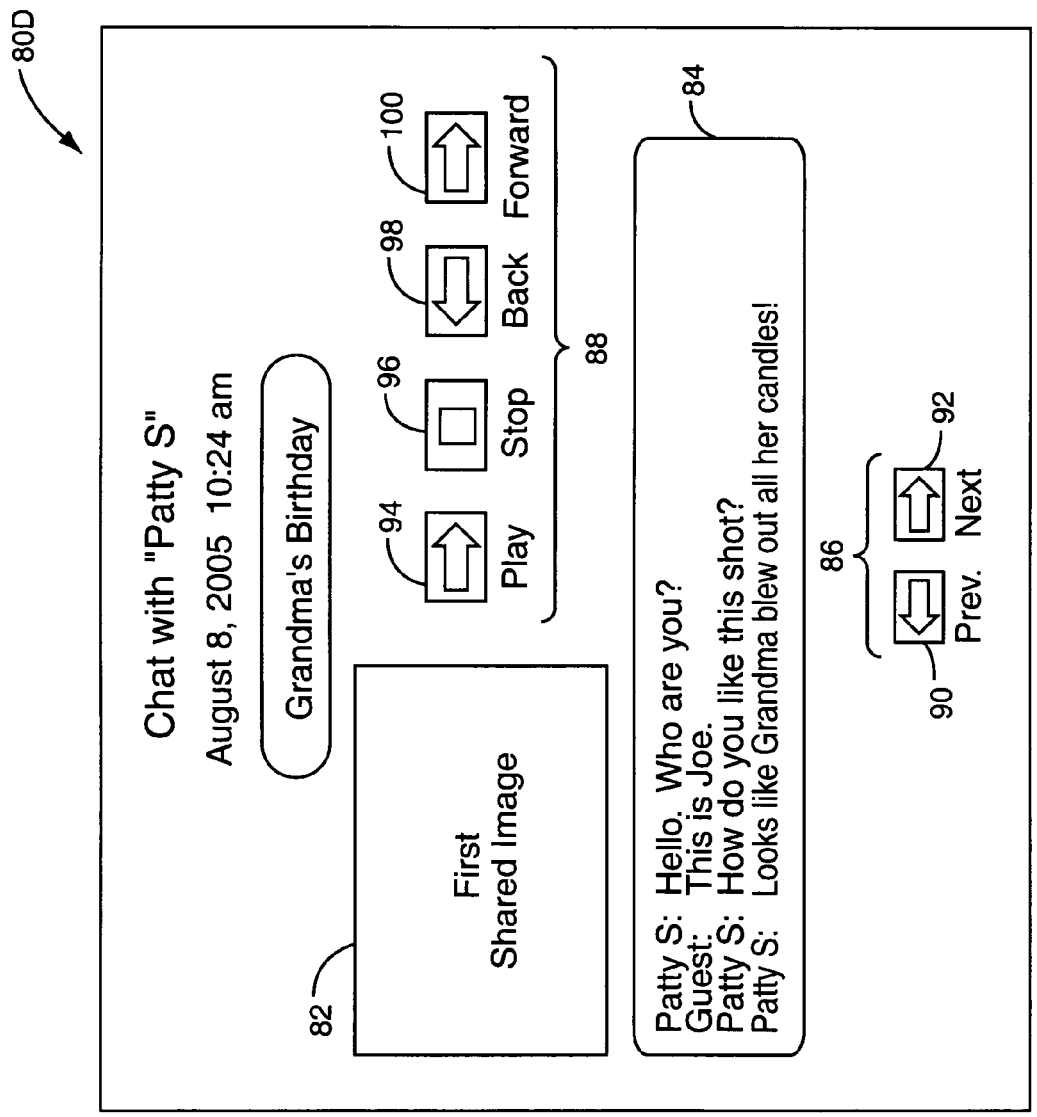
Figure 6E:
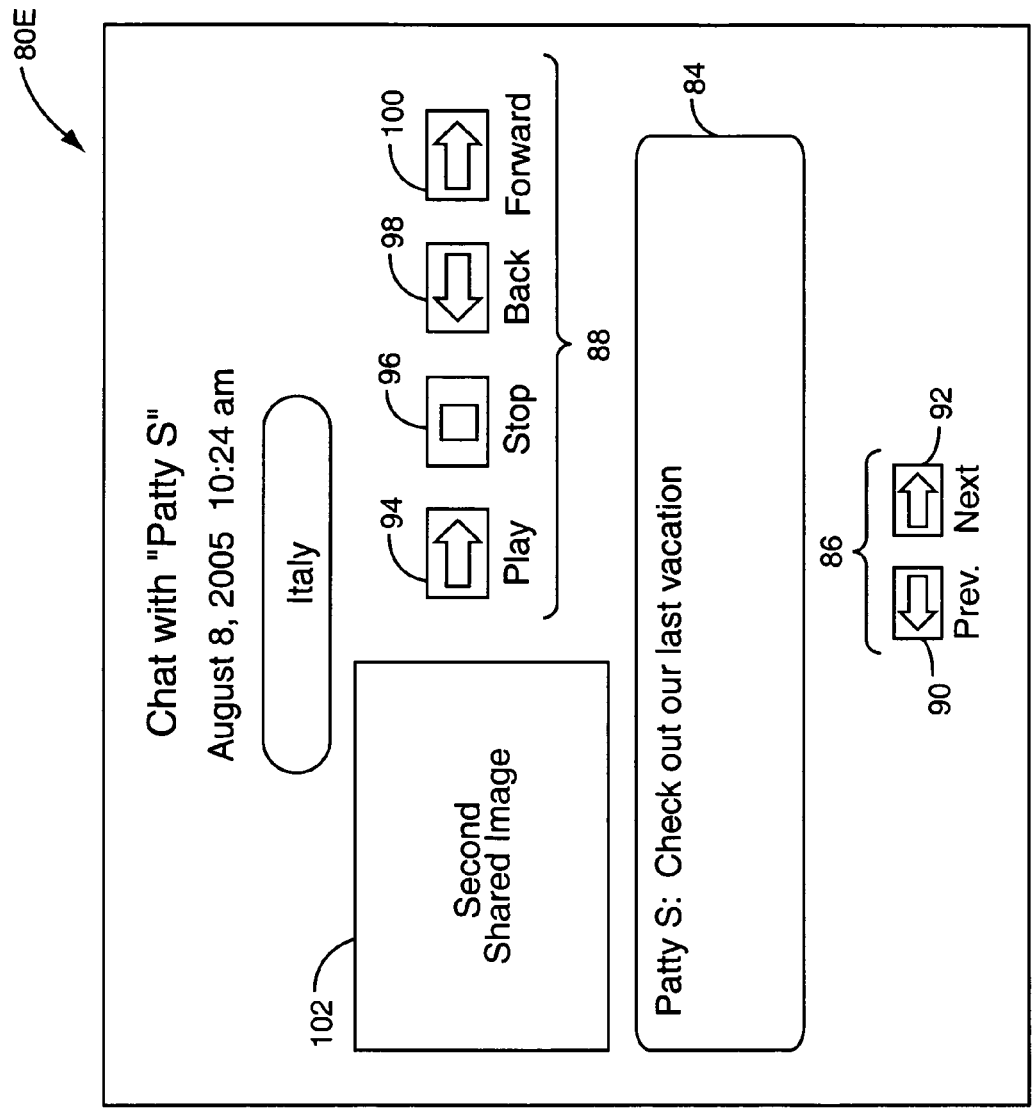
Figure 6F:
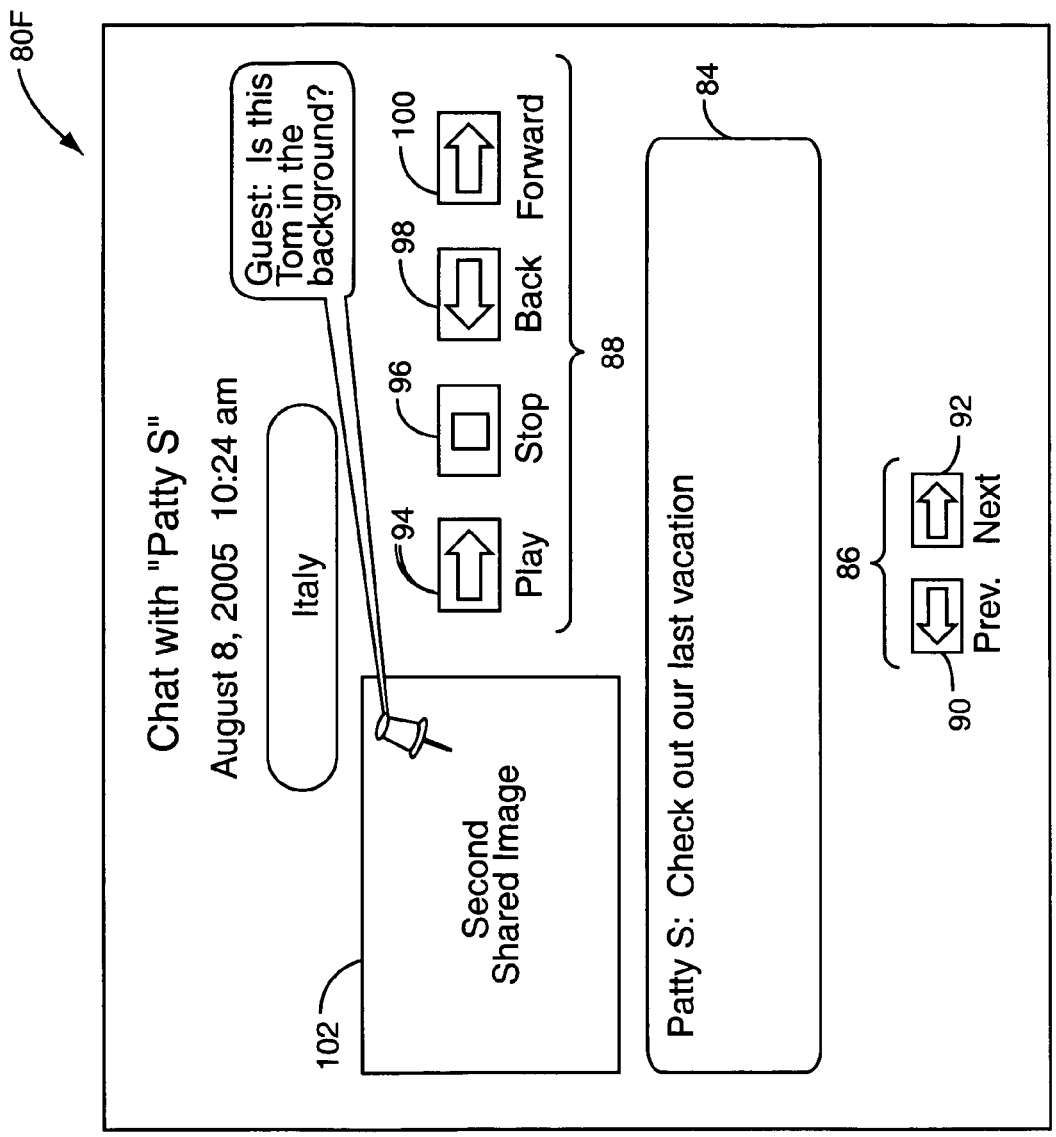
Figure 6G:
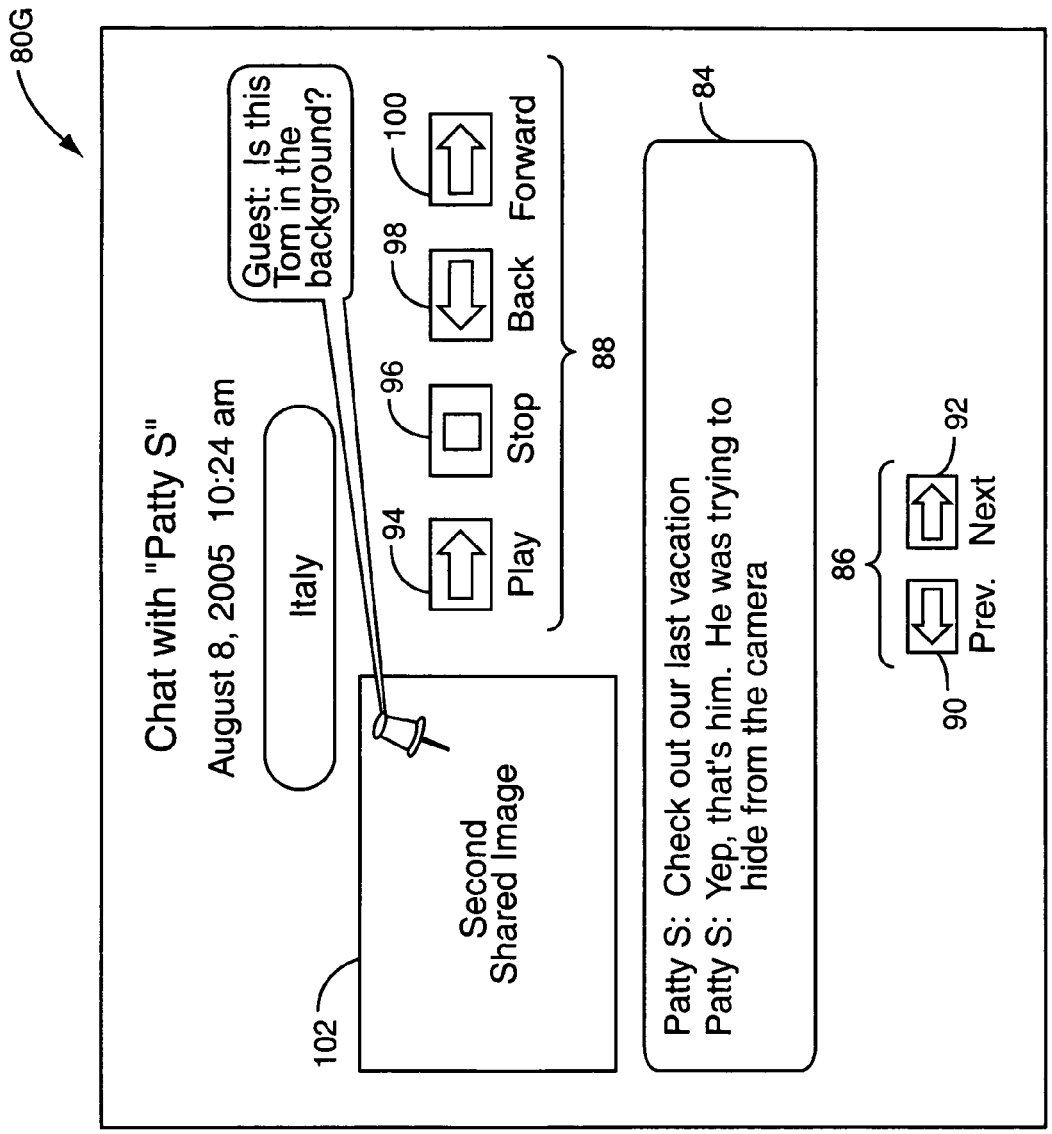

If the viewer activates the "next" button 92 in the main controls 86, the chat history would jump to the next shared image as shown in FIG. 6E. However, in this example, the viewer either chooses to manually step through or play the secondary slideshow for the first shared image 82. Thus, as illustrated in FIG. 6B, a second slide 80B in the chat history includes the text chat message from the user 24 in response to the message from the user 20 in the first slide 80A. Note that, in the preferred embodiment, each text message is displayed line by line rather than letter by letter. As shown in FIGS. 6C and 6D, the third and fourth slides 80C and 80D continue to re-play the photo chat session between the user 20 and the user 24 for the first shared image 82.

At the end of the secondary slideshow for the first shared image 82, the main slideshow proceeds to a second shared image 102, as illustrated in FIG. 6E. Again, assume that the viewer has chosen to either manually step through or play the secondary slide show for the second shared image 102. The slides 80F and 80G shown in FIGS. 6F and 6G then re-play the portion of the photo chat session for the second shared image 102. Note that if the viewer has chosen to play the chat history, the chat history may automatically start playing the secondary slideshow for the second shared image after the end of the secondary slideshow for the first shared image.

FIGS. 6A-6G illustrate an exemplary embodiment of the chat history. In an alternative embodiment, rather than starting the chat history at the first shared image 82 as shown in FIG. 6A, the chat history may begin by showing a thumbnail of each image shared during the photo chat session. The viewer may then select a desired one of the shared images and either step through or play the slideshow for the portion of the photo chat session pertaining to the selected image.

Figure 7:
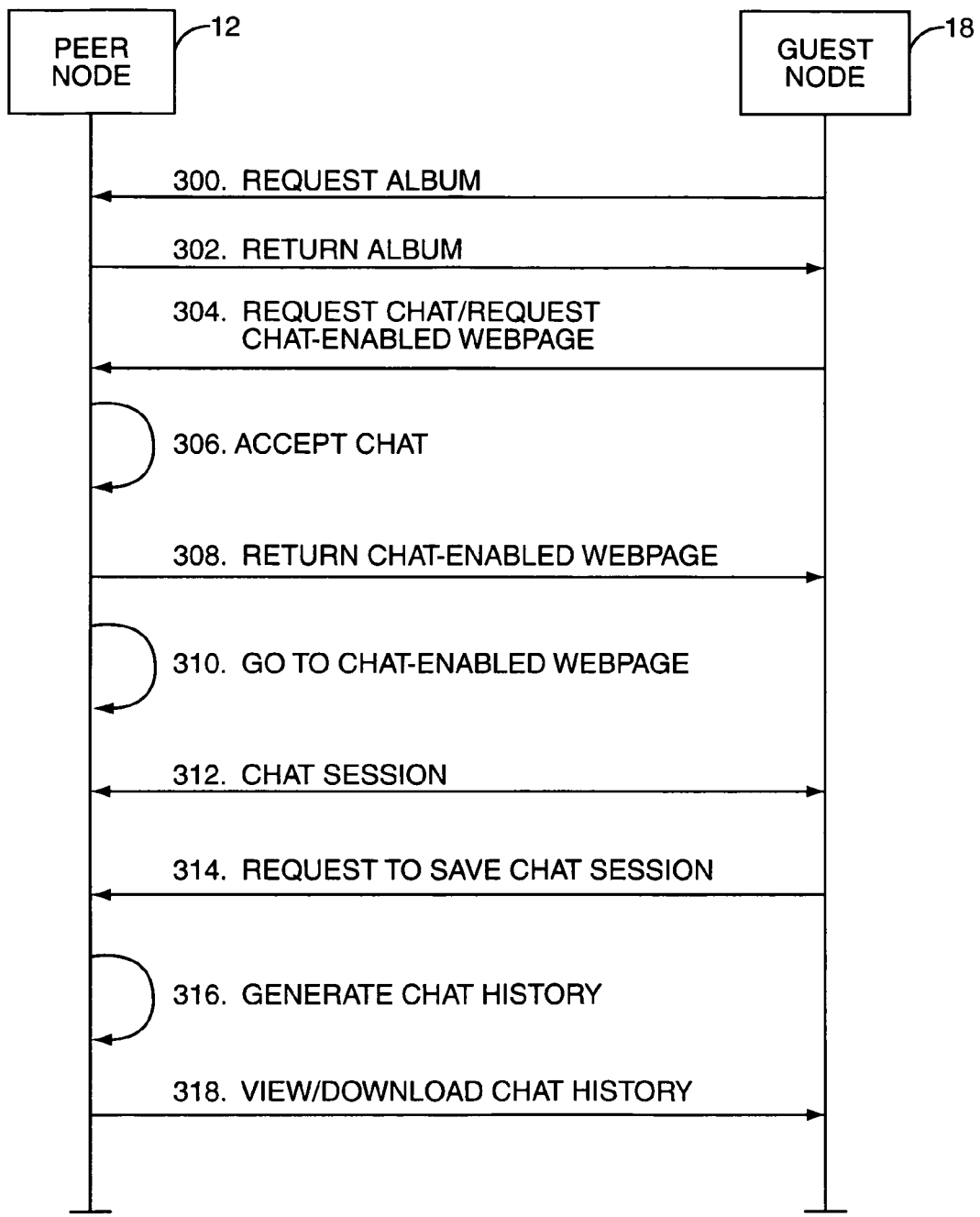
FIG. 7 illustrates an exemplary process for establishing a photo chat session between an owner of an online photo album and a guest viewing the online photo album at the request of the guest according to another embodiment of the present invention.

FIG. 7 illustrates the process of establishing a photo chat session according to another embodiment of the present invention. This embodiment is similar to that shown in FIG. 2. However, the photo chat session is initiated by the user 24 at the guest node 18 rather than the user 20 at the peer node 12. As described above, the guest node 18 requests one of the photo albums 36 from the peer node 12 (step 300); and, in response, the peer node 12 provides the requested one of the photo albums 36 to the guest node 18 as a photo album webpage (step 302). The peer node 12, and more specifically the peer software 28, may optionally notify the user 20 that the user 24 at the guest node 18 is currently viewing the photo album 36. This may be beneficial in an embodiment where either the user 24 or user 20 may initiate the photo chat session. However, in this embodiment, such notification is not needed.

While viewing the photo album 36, the user 24 at the guest node 18 may desire to chat with the owner of the photo album 36, which is the user 20 at the peer node 12. As such, the user 24 may request a chat with the user 20 by, for example, activating the "Start Photo Chat" button 48 in the photo album webpage 43 (FIG. 3). In response, the web browser 42 at the guest node 18 sends a request for a chat-enabled webpage to the peer node 12 via the proxy 38 (step 304). In response, the peer node 12 may provide the request to chat to the user 20 at the peer node 12 as a pop-up window including a web link to a chat-enabled webpage. Referring to FIG. 4, in another embodiment, the request may be provided to the user 20 at the peer node 18 by causing a "Start Photo Chat" button 52 corresponding to the user 24 in the list of guests 50 to start blinking, change colors, or the like. It should also be noted that, in one embodiment, the user 24 at the guest node 18 may be provided with an indication as to whether the user 20 at the peer node 12 is currently online to assist the user 24 in deciding whether to request the chat.

The user 20 at the peer node 12 then interacts with the peer node 12 to accept the chat request by, for example, activating the "Start Photo Chat" button 52 in the list of guests 50 (step 306). Once the chat has been accepted, the web server 30 provides the chat-enabled webpage to the web browser 42 at the guest node 18 (step 308). In addition, the web browser 32 at the peer node 12 is directed to the chat-enabled webpage (step 310). At this point, the photo chat session is established, and the user 20 at the peer node 12 and the user 24 at the guest node 18 chat with one another while simultaneously viewing images from one or more of the photo albums 36 (step 312).

When either the user 20 or the user 24 desires to end the photo chat session, the photo chat session may be ended by, for example, activating the "End Photo Chat" button 74 in the chat-enabled webpage 54 (FIGS. 5A-5G). At this point, either the user 20 or the user 24 may also request that the photo chat session be saved. For example, once the photo chat session is ended, the text within the "End Photo Chat" button 74 may be changed to "Save Photo Chat." If the user 24 then activates the button 74, the web browser 42 at the guest node 18 generates a request to save the photo chat session and sends the request to the peer node 12 via the proxy 38 (step 314). In response, the peer node 12, and specifically the peer software 28, generates a chat history, as described above (step 316). Thereafter, since the request to save the photo chat session was made by the user 24 at the guest node 18, the chat history may be viewed or downloaded by the user 24 at the guest node 18 (step 318). However, the chat history may be stored at the peer node 12 such that either the user 20 or the user 24 may view the chat history. Alternatively, after download to the guest node 18, the peer node 12 may or may not retain a copy of the chat history for viewing by the user 20 or subsequent re-transmission to the guest node 18.

Figure 8:
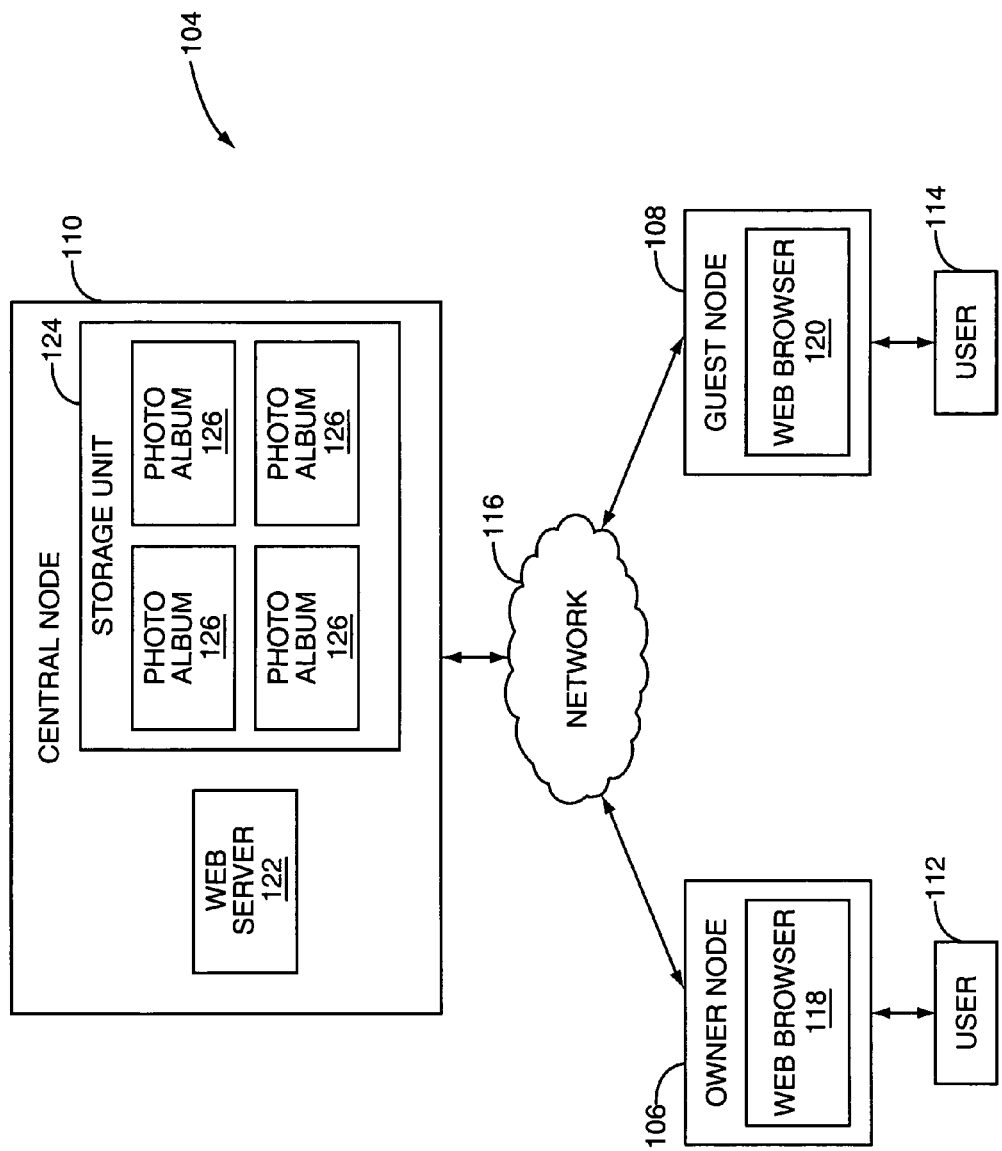
FIG. 8 illustrates an exemplary centrally hosted photosharing system according to one embodiment of the present invention.

FIG. 8 illustrates an alternative embodiment wherein the present invention is implemented in a centrally hosted photosharing system 104 rather than the hybrid P2P system 10 of FIG. 1. The system 104 includes an owner node 106, a guest node 108, a central node 110, users 112 and 114, and a network 116. Preferably, the network 116 is the Internet. There may be any number of owner nodes 106 and guest nodes 108.

In general, the owner and guest nodes 106 and 108 are personal computers, mobile terminals, Personal Digital Assistants, or the like having access to the network 116. As illustrated, the owner node 106 includes a web browser 118, and the guest node 108 includes a web browser 120. The user 112 may be referred to herein as an owner, and the user 114 may be referred to herein as a guest.

The central node 110 includes a web server 122 and a storage unit 124. The web server 122 may be implemented in hardware and/or software. The storage unit 124 may be memory such as Random Access Memory (RAM) or some other storage device such as a hard disc drive. The storage unit 124 operates to store a number of photo albums 126 associated with the user 112 at the owner node 106. Each of the photo albums 126 includes a number of digital images. The storage unit 124 may also store photo albums for owners in addition to the user 112 at the owner node 106.

In operation, the user 112 may interact with the central node 110 through the web browser 118 to upload the photo albums 126 and to invite the user 114 to view the photo albums 126. The user 114 may be invited by sending an email invitation including a web link to the photo albums 126 at the central node 110. When the user 114 desires to view the photo albums 126, the user 114 may activate the web link to the photo albums 126 or enter the associated Uniform Resource Locator (URL) in the web browser 120. Before viewing the photo albums 126, the user 114 may be required to log-in using a username and/or password. The username and/or password may be supplied in the email invitation.

Figure 9:
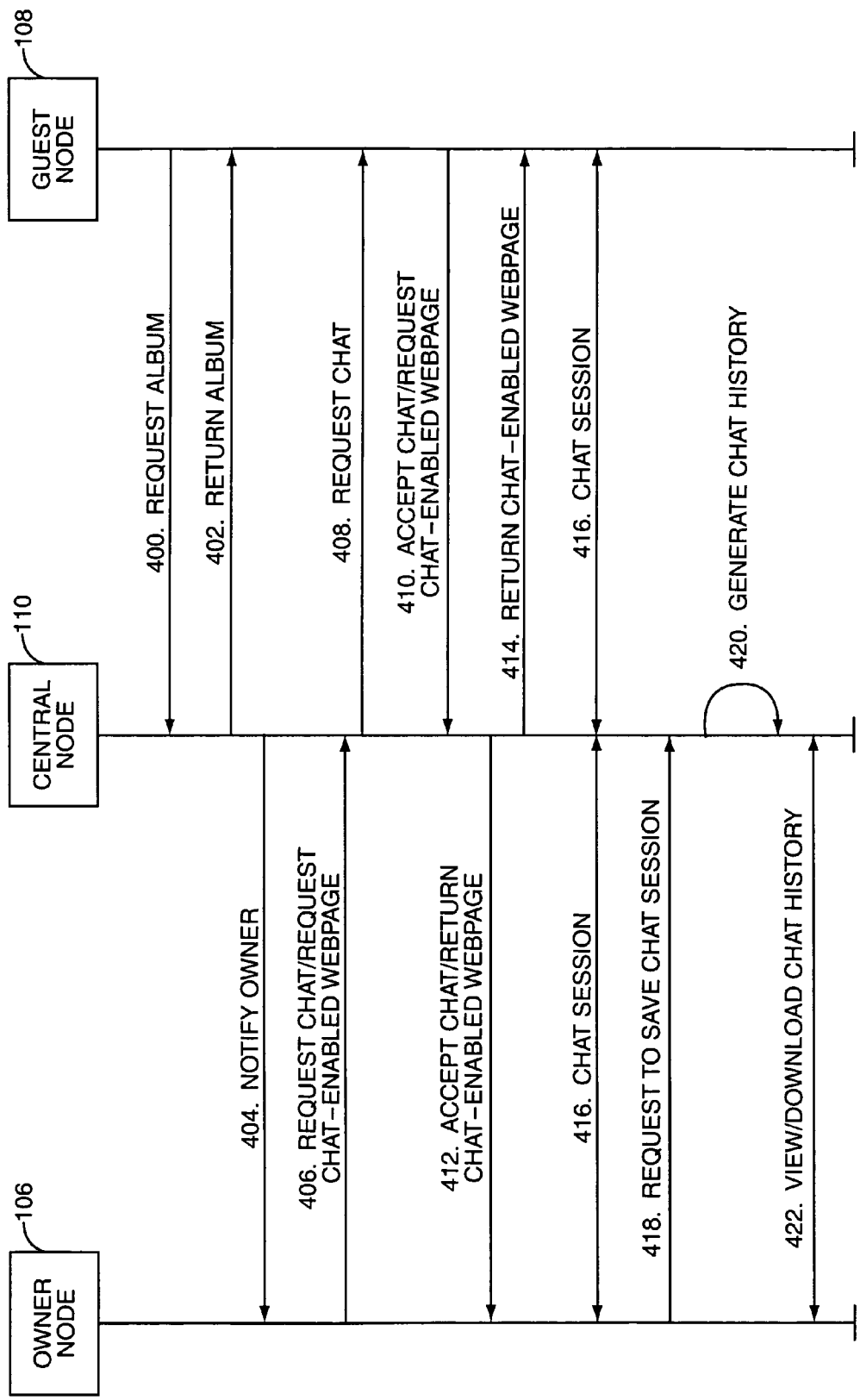
FIG. 9 illustrates an exemplary process for establishing a photo chat session between an owner of an online photo album and a guest viewing the online photo album in the centrally hosted photosharing system at the request of the owner according to one embodiment of the present invention.

According to the present invention, either the user 112 or the user 114 may initiate a photo chat session while the user 114 is viewing the photo albums. More specifically, FIG. 9 illustrates the process of establishing the photo chat session at the request of the user 112 and optionally saving the photo chat session. As illustrated, the process begins when the web browser 120 at the guest node 108 requests one of the photo albums 126 from the central node 110 (step 400), and the central node 110 returns the requested photo album 126 in the form of a photo album webpage such as that shown in FIG. 3 (step 402).

The central node 110 sends a notification to the owner node 106 that the user 114 at the guest node 108 is currently viewing the requested photo album (step 404). In one embodiment, the user 112 views a list of guests such as that shown in FIG. 4 using the web browser 118. More specifically, when the user 112 desires to view the list of guests, the user 112 may access the central node 110 via the web browser 118. Accessing the central node 110 may include entering a known URL of the central node 110 and logging-in using a username and password associated with the user 112. The user 112 may then interact with the web browser 118 to request the list of guests currently viewing each of the photo albums 126 from the central node 110. In response, the central node 110 provides a webpage including the list of guests currently viewing each of the photo albums 126 associated with the user 112 to the web browser 118 at the owner node 106. The central node 110 may generate the list of guests in response to receiving the request. Alternatively, the central node 110 may continuously maintain the list of guests and provide the list of guests from memory upon receiving the request. Thereafter, the central node 110 operates to update the list of guests and provide the updated list of guests to the owner node 106 as the guests browse through the photo albums 126.

If the user 112 desires to chat with the user 114 currently viewing one of the photo albums 126, the user 112 interacts with the web browser 118 such that the web browser 118 sends a request to chat to the central node 110 (step 406). The request to chat may include a request for a chat-enabled webpage and identify the user 114 at the guest node 118 or the guest node 118. In one embodiment, the request to chat may include activating a "Start Photo Chat" button associated with the user 114 in the list of guests viewed by the user 112 at the owner node 106. In response, the web browser 118 may generate the request for the chat-enabled webpage using an embedded web link associated with the "Start Photo Chat" button.

Upon receiving the request from the owner node 106, the central node 110 sends a request to chat to the guest node 108 (step 408). The central node 110 may send the request by, for example, sending a pop-up to the web browser 120 at the guest node 108 or causing a "Start Chat" button to appear or begin blinking in the photo album webpage currently being viewed by the user 114. The user 114 then accepts the chat, and the web browser 120 sends a request for the chat-enabled webpage to the central node 110 (step 410). The user 114 may accept the chat by clicking on a web link within a pop-up or by activating a "Start Chat" button within the photo album webpage.

In response to receiving the acceptance and the request for the chat-enabled webpage from the guest node 108, the central node 110 provides the chat-enabled webpage to the owner node 106 and the guest node 108 (steps 412 and 414). At this point, the photo chat session is established and the users 112 and 114 chat while simultaneously viewing images from the photo albums 126, as described above (step 416). As an example, when the user 112 enters a text message, the text message is provided to the central node 110. In response, the central node 110 updates the chat-enabled webpage such that the text message is provided to the web browser 120 at the guest node 108.

When the photo chat session is complete, either the user 112 or the user 114 may request that the photo chat session be saved. In this example, the user 112 requests that the photo chat session be saved. In response, the owner node 106 sends a request to save the photo chat session to the central node 110 (step 418). Upon receiving the request, the central node 110 generates a chat history based on information stored during the photo chat session, as described above (step 420). Thereafter, the chat history may be viewed and/or downloaded by the owner node 106 (step 422).

Figure 10:
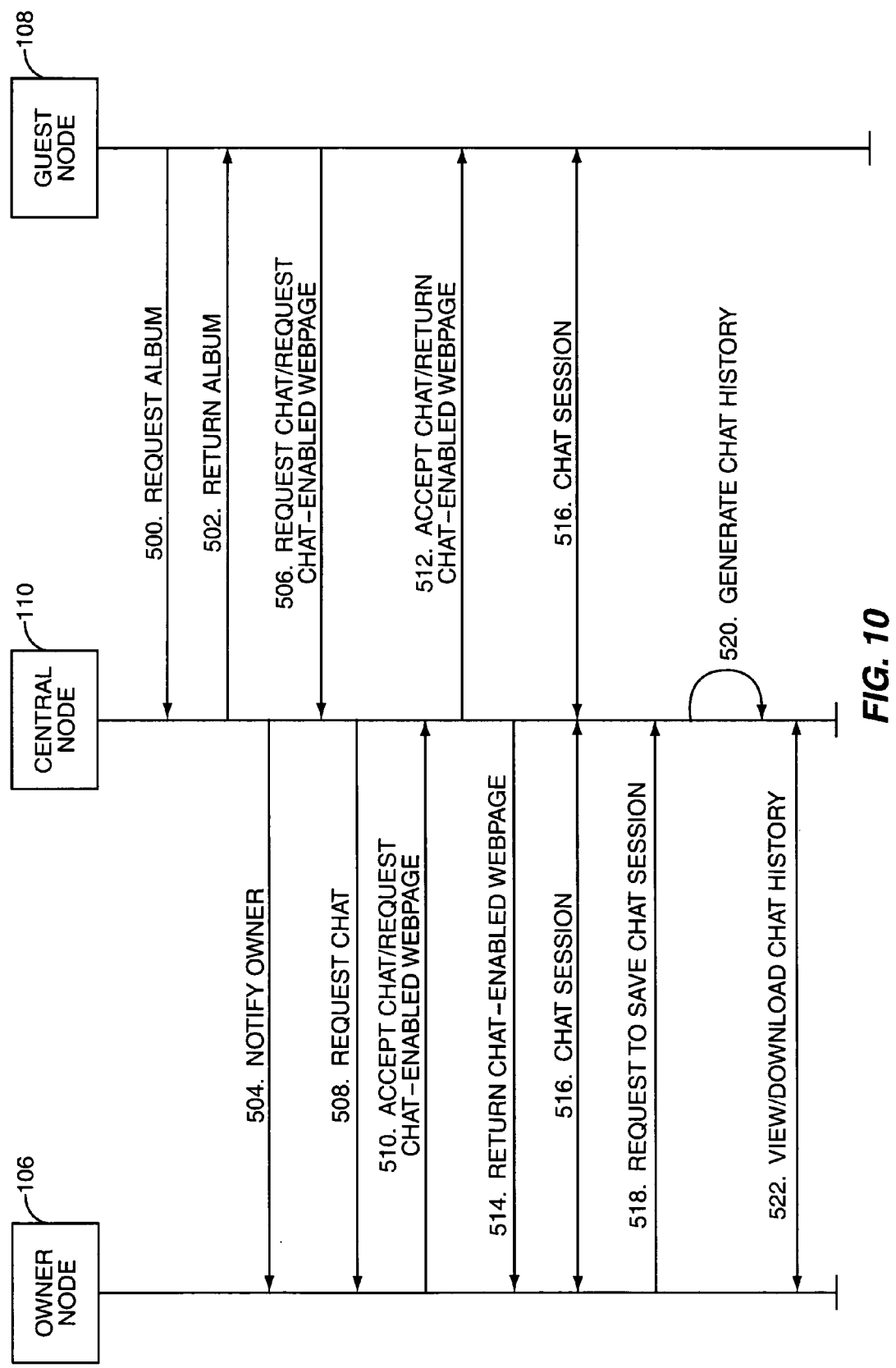
FIG. 10 illustrates an exemplary process for establishing a photo chat session between an owner of an online photo album and a guest viewing the online photo album in the centrally hosted photosharing system at the request of the guest according to another embodiment of the present invention.

FIG. 10 is similar to FIG. 9 and illustrates the embodiment where the photo chat session is initiated by the user 114 at the guest node 108. As illustrated, the process begins when the web browser 120 at the guest node 108 requests one of the photo albums 126 from the central node 110 (step 500), and the central node 110 returns the requested photo album 126 in the form of a photo album webpage such as that shown in FIG. 3 (step 502).

The central node 110 sends a notification to the owner node 106 that the user 114 at the guest node 108 is currently viewing the requested photo album (step 504). In one embodiment, the user 112 views a list of guests such as that shown in FIG. 4 using the web browser 118. More specifically, when the user 112 desires to view the list of guests, the user 112 may access the central node 110 via the web browser 118. Accessing the central node 110 may include entering a known URL of the central node 110 and logging-in using a username and password associated with the user 112. The user 112 may then interact with the web browser 118 to request the list of guests currently viewing each of the photo albums 126. In response, the central node 110 provides a webpage including the list of guests currently viewing each of the photo albums 126 associated with the user 112 to the web browser 118 at the owner node 106. The central node 110 may generate the list of guests in response to receiving the request. Alternatively, the central node 110 may continuously maintain the list of guests and provide the list of guests from memory upon receiving the request. Thereafter, the central node 110 operates to update the list of guests and provide the updated list of guests to the owner node 106 as the guests browse through the photo albums 126. In another embodiment, the central node 110 may notify the user 112 at the owner node 106 by sending an email notification or a pop-up message.

The user 114 at the guest node 108 may then initiate a photo chat session. More specifically, the user 114 may activate a "Start Photo Chat" button on the photo album webpage. In response, the web browser 120 at the guest node 108 sends a request for a photo chat session to the central node 110 (step 506). In one embodiment, the request for the photo chat session includes a request for a chat-enabled webpage.

Upon receiving the request from the guest node 108, the central node 110 sends a request to chat to the owner node 106 (step 508). The central node 110 may send the request by, for example, sending a pop-up to the web browser 118 at the owner node 106, causing a "Start Chat" button to appear or begin blinking in a webpage being viewed by the user 112 and showing the list of guests, or by sending an email message to the user 112. The user 112 then accepts the chat, and the web browser 118 at the owner node 106 sends a request for the chat-enabled webpage to the central node 110 (step 510).

In response to receiving the acceptance and the request for the chat-enabled webpage from the owner node 106, the central node 110 provides the chat-enabled webpage to the guest node 108 and the owner node 106 (steps 512 and 514). At this point, the photo chat session is established, and the users 112 and 114 chat while simultaneously viewing images from the photo albums 126, as described above (step 516). When the photo chat session is complete, either the user 112 or the user 114 may request that the photo chat session be saved. In this example, the user 112 requests that the photo chat session be saved. In response, the owner node 106 sends a request to save the photo chat session to the central node 110 (step 518). Upon receiving the request, the central node 110 generates a chat history based on information stored during the photo chat session, as described above (step 520). Thereafter, the chat history may be viewed and/or downloaded by the owner node 106 (step 522).

Figure 11:
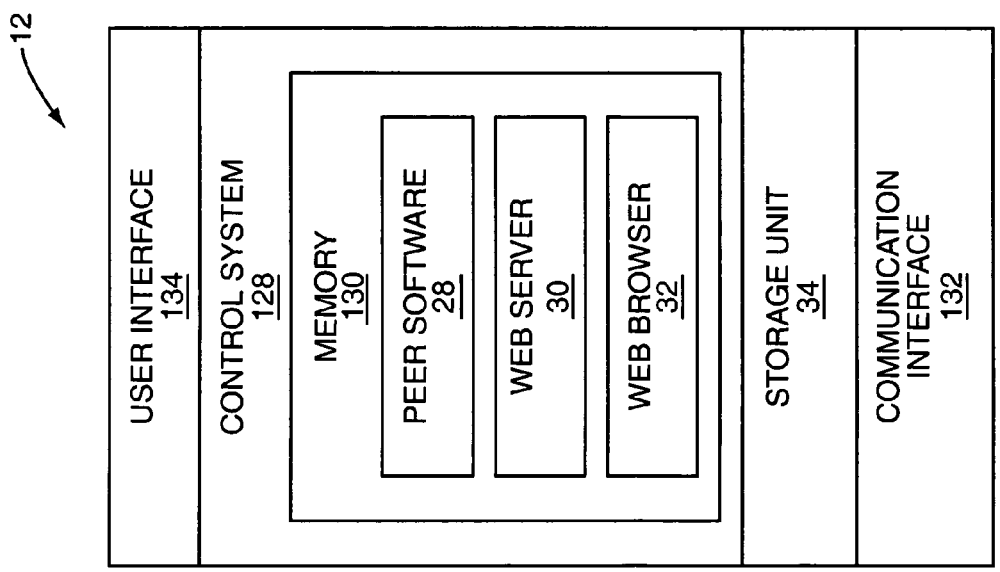
FIG. 11 is a block diagram of the peer nodes of FIG. 1 according to one embodiment of the present invention.

FIG. 11 is a block diagram of the peer node 12 of FIG. 1. The peer node 12 may generally include a control system 128 having associated memory 130. The memory 130 may store the peer software 28, the web server 30, and the web browser 32. Note that the web server 30 may be implemented in hardware and/or software. The peer node 12 also includes the storage unit 34. In an alternative embodiment, the storage unit 34 may be included within the memory 130. The peer node 12 also includes a communication interface 132 for communicating with other network entities via the network 26. The communication interface 132 also may include an interface to various external devices such as a printer. The peer node 12 also includes a user interface 134, which may include a keypad, mouse, display, and the like (not shown).

Figure 12:
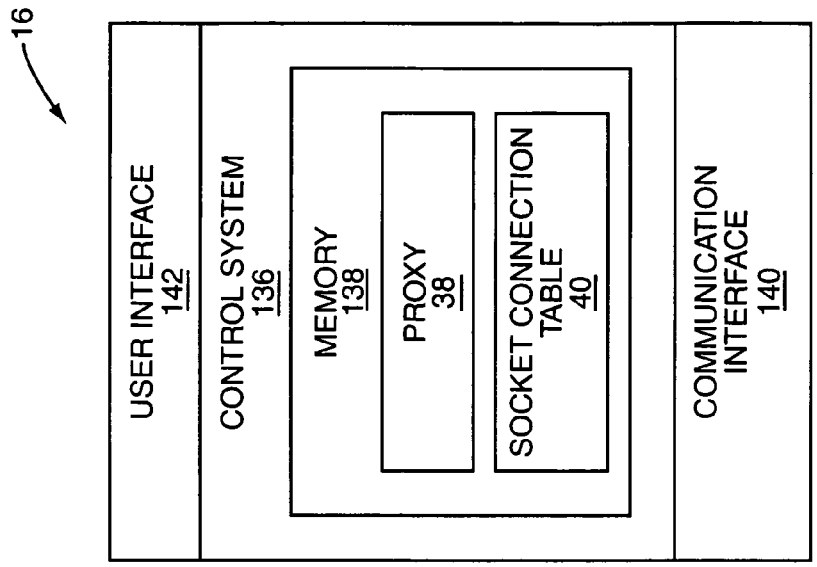
FIG. 12 is a block diagram of the central node of FIG. 1 according to one embodiment of the present invention.

FIG. 12 is a block diagram of the central node 16 of FIG. 1. The central node 16 may generally include a control system 136 having associated memory 138. The memory 138 may store the proxy software 38 and the socket connection table 40. Note that the proxy 38 may be implemented in hardware and/or software. The central node 16 may also include a communication interface 140 for communicating with other network entities via the network 26. The communication interface 140 may also include an interface to various external devices. The central node 16 may also include a user interface 142, which may include a keypad, mouse, display, and the like (not shown).

Figure 13:
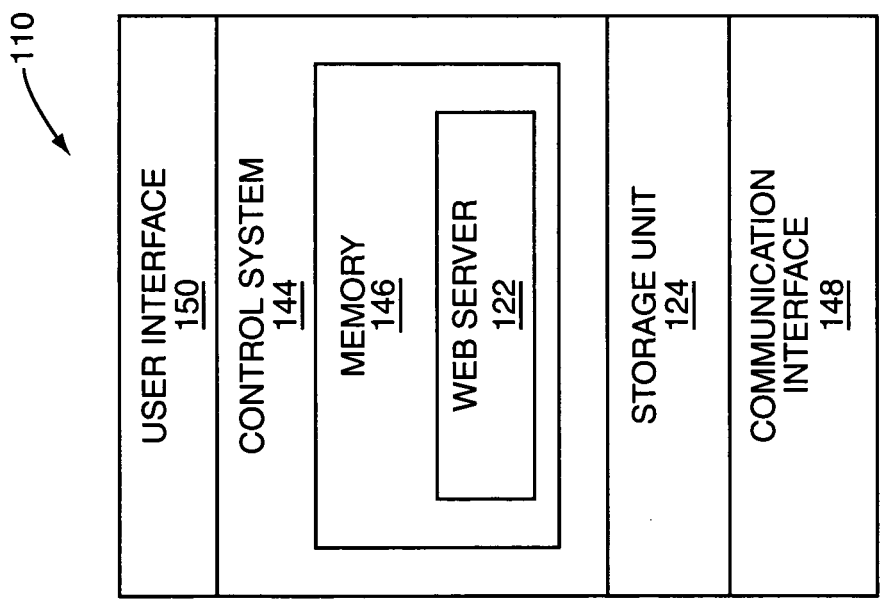
FIG. 13 is a block diagram of the central node of FIG. 8 according to one embodiment of the present invention.

FIG. 13 is a block diagram of the central node 110 of FIG. 8. The central node 110 may generally include a control system 144 having associated memory 146. The memory 146 may store the web server 122. Note that the web server 122 may be implemented in hardware and/or software. The central node 110 also includes the storage unit 124. In an alternative embodiment, the storage unit 124 may be included within the memory 146. The central node 110 may also include a communication interface 148 for communicating with other network entities via the network 116. The communication interface 148 may also include an interface to various external devices. The central node 110 may also include a user interface 150, which may include a keypad, mouse, display, and the like (not shown).

Figure 14:
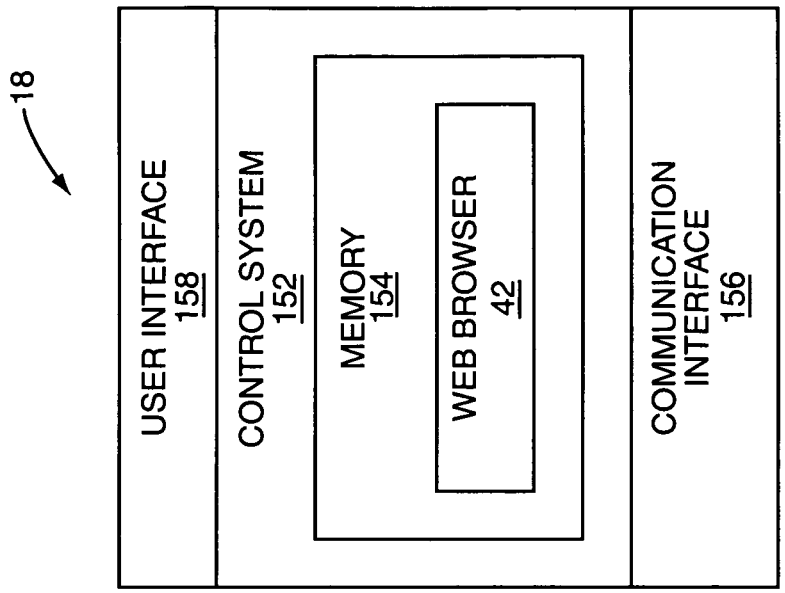
FIG. 14 is a block diagram of the guest node of FIG. 1 and the owner and guest nodes of FIG. 8 according to one embodiment of the present invention.

FIG. 14 is a block diagram of the guest node 18 of FIG. 1. However, this discussion is equally applicable to the owner and guest nodes 106 and 108 of FIG. 8. The guest node 18 may generally include a control system 152 having associated memory 154. The memory 154 may store the web browser 42. The guest node 18 also includes a communication interface 156 for communicating with other network entities via the network 26. The communication interface 156 also may include an interface to various external devices such as a printer. The guest node 18 also includes a user interface 158, which may include a keypad, mouse, display, and the like (not shown).

Those skilled in the art will recognize improvements and modifications to the preferred embodiments of the present invention. All such improvements and modifications are considered within the scope of the concepts disclosed herein and the claims that follow.

What is claimed is:

1. A method of recording a photo chat session including communications between a first user and a second user who are viewing a plurality of images, the method comprising:
   recording information defining the photo chat session during the photo chat session;
   receiving a request to save the photo chat session; and
   generating a chat history comprising a plurality of slideshows, wherein each one of the plurality of slideshows corresponds to a different one of the plurality of images, each of the plurality of slideshows comprising a sequence of slides wherein each slide in the sequence comprises the corresponding one of the plurality of images and a successive portion of the communications that occurred when the corresponding one of the plurality of images was viewed by the first user and the second user.

2. The method of claim 1 wherein recording the information defining the photo chat session comprises, for each of the plurality of images, storing text chat messages exchanged during a portion of the photo chat session associated with the image.

3. The method of claim 1 wherein recording the information defining the photo chat session comprises storing information defining an indicator pointing to a particular location within one of the plurality of images and a comment associated with the indicator added during a portion of the photo chat session associated with the one of the plurality of images.

4. The method of claim 1 wherein recording the information defining the photo chat session comprises recording a voice-based conversation between participants of the photo chat session and, for each of the plurality of images, storing information associating the image with a corresponding portion of the voice-based conversation.

5. The method of claim 1 wherein the chat history further comprises a plurality of user selectable images, wherein each of the plurality of user selectable images corresponds to a different one of the plurality of slideshows and enables selection of the corresponding one of the plurality of slideshows.

6. The method of claim 1 wherein generating the chat history further comprises generating a main slideshow linking the plurality of slideshows.

7. The method of claim 1 wherein generating the chat history comprises generating the chat history as an executable file.

8. The method of claim 1 wherein generating the chat history comprises generating the chat history as a plurality of linked webpages.

9. The method of claim 1 further comprising: establishing the photo chat session between an owner at a peer node hosting an online photo album and a guest viewing the online photo album at a guest node.

10. The method of claim 9 wherein generating the chat history further comprises generating the chat history at the peer node.

11. The method of claim 10 further comprising: providing the chat history from the peer node to the guest node.

12. The method of claim 1 further comprising: establishing the photo chat session between an owner at an owner node associated with an online photo album hosted at a central node in a centrally hosted photosharing system and a guest viewing the online photo album at a guest node.

13. The method of claim 12 wherein generating the chat history further comprises generating the chat history at the central node.

14. The method of claim 13 further comprising: providing the chat history from the central node to at least one of the owner node and the guest node.

15. A system comprising:
 a) a communication interface coupled to a network for communicating with a guest node;
 b) a storage unit adapted to store an online photo album; and
 c) a control system adapted to:
 i) establish a photo chat session between an owner associated with the online photo album and a guest viewing a plurality of images from the online photo album at the guest node;
 ii) record information defining the photo chat session during the photo chat session;
 iii) receive a request to save the photo chat session from one of the owner and the guest; and
 iv) generate a chat history comprising a plurality of slideshows, wherein each one of the plurality of slideshows corresponds to a different one of the plurality of images, each of the plurality of slideshows comprising a sequence of slides wherein each slide in the sequence comprises the corresponding one of the plurality of images and a successive portion of communications that occurred when the corresponding one of the plurality of images was viewed by the owner and the guest.

16. The system of claim 15 wherein the information defining the photo chat session comprises, for each of the plurality of images, text chat messages exchanged during a portion of the photo chat session associated with the image.

17. The system of claim 15 wherein the information defining the photo chat session comprises information defining an indicator pointing to a particular location within one of the plurality of images and a comment associated with the indicator added during a portion of the photo chat session associated with the one of the plurality of images.

18. The system of claim 15 wherein the information defining the photo chat session comprises a recording of a voice-based conversation between participants of the photo chat session and, for each of the plurality of images, information associating the image with a corresponding portion of the voice-based conversation.

19. The system of claim 15 wherein the corresponding one of the plurality of slideshows includes a plurality of slides recreating a portion of the photo chat session associated with the corresponding one of the plurality of images.

20. The system of claim 15 wherein the chat history further comprises a main slideshow linking the plurality of slideshows.

21. The system of claim 15 wherein the control system is further adapted to generate the chat history as an executable file.

22. The system of claim 15 wherein the control system is further adapted to generate the chat history as a plurality of linked webpages.

23. The system of claim 15 wherein the system is a peer node hosting the online photo album and the control system is further adapted to establish the photo chat session between the owner at the peer node and the guest viewing the online photo album at the guest node.

24. The system of claim 23 wherein the control system is further adapted to provide the chat history to the guest node.

25. The system of claim 15 wherein the system is a central node hosting the online photo album in a centrally hosted photosharing system and the control system is further adapted to establish the photo chat session between the owner at an owner node and the guest viewing the online photo album at the guest node.

26. The system of claim 25 wherein the control system is further adapted to provide the chat history from the central node to at least one of the owner node and the guest node.

27. The method of claim 5 further comprising: receiving an input identifying one of the user selectable images; and presenting the one of the plurality of slideshows corresponding to the one of the user selectable images in response to the input.

28. The system of claim 15 wherein the chat history further comprises a plurality of user selectable images, wherein each of the plurality of user selectable images corresponds to a different one of the plurality of slideshows and enables selection of the corresponding one of the plurality of slideshows.

29. The system of claim 28 wherein the control system is further adapted to receive an input identifying one of the user selectable images, and present the one of the plurality of slideshows corresponding to the one of the user selectable images in response to the input.

30. The method of claim 1, wherein each slide in the sequence of slides for each of the plurality of slideshows further comprises a back control which, upon selection, displays a previous slide in the sequence of slides of the corresponding slideshow, and a forward control which, upon selection, displays a next slide in the sequence of slides of the corresponding slideshow.

31. The method of claim 30, wherein each slide in the sequence of slides for each of the plurality of slideshows further comprises a previous control which, upon selection, enables selection of a previous one of the plurality of slideshows, and a next control which, upon selection, enables selection of a subsequent one of the plurality of slideshows.

* * * * *